United States Patent
Fujisawa et al.

(10) Patent No.: US 11,115,117 B2
(45) Date of Patent: Sep. 7, 2021

(54) SUBMARINE OPTICAL COMMUNICATION CONTROL DEVICE, CONTROL METHOD, AND NON-TRANSITORY COMPUTER-READABLE MEDIUM

(71) Applicant: NEC CORPORATION, Tokyo (JP)

(72) Inventors: Shinsuke Fujisawa, Tokyo (JP);
Hitoshi Takeshita, Tokyo (JP);
Shigeyuki Yanagimachi, Tokyo (JP);
Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/041,142

(22) PCT Filed: Mar. 27, 2018

(86) PCT No.: PCT/JP2018/012258
§ 371 (c)(1),
(2) Date: Sep. 24, 2020

(87) PCT Pub. No.: WO2019/186672
PCT Pub. Date: Oct. 3, 2019

(65) Prior Publication Data
US 2021/0013965 A1 Jan. 14, 2021

(51) Int. Cl.
*H04B 10/079* (2013.01)
*H04B 10/25* (2013.01)
*H04B 10/294* (2013.01)

(52) U.S. Cl.
CPC ....... *H04B 10/07955* (2013.01); *H04B 10/25* (2013.01); *H04B 10/2942* (2013.01)

(58) Field of Classification Search
CPC .............. H04B 10/07955; H04B 10/25; H04B 10/2942; H04B 10/80

(Continued)

(56) References Cited

U.S. PATENT DOCUMENTS 4,313,224 A * 1/1982 Wakabayashi ....... H04B 10/077
398/16
5,296,957 A * 3/1994 Takahashi .......... H04B 10/2939
398/177

(Continued)

FOREIGN PATENT DOCUMENTS

EP 2213022 A1 8/2010
JP 09-289494 A 11/1997

(Continued)

OTHER PUBLICATIONS

International Search Report for PCT/JP2018/012258 dated Jun. 26, 2018 [PCT/ISA/210].

(Continued)

*Primary Examiner* — Dalzid E Singh
(74) *Attorney, Agent, or Firm* — Sughrue Mion, PLLC

(57) ABSTRACT

A submarine optical communication system control device (1) according to the present invention includes: a light intensity distribution determination device (2) configured to determine an optimum distribution of signal light intensity of each optical path for each allocated frequency; a light intensity distribution measuring device (3) configured to measure a light intensity distribution of an optical path after transmission through a submarine cable transmission line; an equalization setting calculation unit (4) configured to calculate a gain equalization setting for compensating for the difference between an optimum distribution in the light intensity distribution determination device and a measured distribution in the light intensity distribution measuring device; and a variable gain equalizer (5) configured to compensate for a light intensity distribution of an optical path to the optimum distribution, based on a gain equalization setting in the equalization setting calculation unit.

15 Claims, 19 Drawing Sheets

(58) Field of Classification Search
USPC .......................................................... 398/38
See application file for complete search history.

(56) References Cited

U.S. PATENT DOCUMENTS

| | | | |
|---|---|---|---|
| 2002/0154359 A1 | 10/2002 | Tsuda et al. | |
| 2004/0091263 A1 | 5/2004 | Sakamoto et al. | |
| 2004/0126119 A1* | 7/2004 | Evangelides, Jr. | ........................ H04B 10/6971 398/158 |
| 2009/0016727 A1 | 1/2009 | Ueki et al. | |
| 2010/0209110 A1* | 8/2010 | Pelouch | ............... H04J 14/0279 398/92 |
| 2012/0093522 A1* | 4/2012 | Qi | ...................... H04B 10/2942 398/174 |
| 2013/0058647 A1* | 3/2013 | Boertjes | ............. H04B 10/0775 398/38 |

FOREIGN PATENT DOCUMENTS

| | | |
|---|---|---|
| JP | 2001-144693 A | 5/2001 |
| JP | 2002-009701 A | 1/2002 |
| JP | 2003-177440 A | 6/2003 |
| JP | 2005-049458 A | 2/2005 |
| JP | 2013-255195 A | 12/2013 |
| WO | 2011/030897 A1 | 3/2011 |

OTHER PUBLICATIONS

Written Opinion for PCT/JP2018/012258 dated Jun. 26, 2018 [PCT/ISA/237].

Extended European Search Report for EP Application No. EP18911576.9 dated Mar. 24, 2021.

\* cited by examiner

SUBMARINE OPTICAL COMMUNICATION CONTROL DEVICE, CONTROL METHOD, AND NON-TRANSITORY COMPUTER-READABLE MEDIUM

CROSS REFERENCE TO RELATED APPLICATIONS

This application is a National Stage of International Application No. PCT/JP2018/012258 filed Mar. 27, 2018.

TECHNICAL FIELD

The present invention relates to a control device measuring signal light intensity and adjusting the signal light intensity, based on the measured value, in order to provide the best transmission characteristic of a submarine optical communication system. The present invention particularly relates to a submarine optical communication system control device, a control method, and a non-transitory computer-readable medium for measuring signal light intensity of signal light accommodated by a submarine optical communication system for each basic optical frequency width and controlling a gain equalizer in order to provide a desired signal light intensity distribution, based on the measured value.

BACKGROUND ART

Optical communication systems provide a function of communicating required traffic through optical fiber communication channels connecting sites. Optical communication systems communicate high-capacity signal light acquired by multiplexing required traffic from clients by use of various multiplexing techniques through optical fiber communication channels. The multiplexing techniques to be used include a wavelength division multiplexing (WDM) technique and a time division multiplexing (TDM) technique. In recent years, a single optical path can accommodate 400 gigabits per second (Gbps) class traffic, and a maximum of 25 terabits per second (Tbps) class high-capacity communication is achievable by the wavelength division multiplexing technique.

Among optical communication systems, submarine optical communication systems using submarine cables are very important in providing a high-capacity communication infrastructure between terrestrial parts separated by the sea. In a submarine optical communication system, station offices called landing stations are installed at opposed terrestrial parts separated by the sea, and a function of communicating required traffic through a submarine cable connecting the landing stations is provided. A landing station is generally installed on the seashore, and a terrestrial optical communication system and a submarine optical communication system are connected at a landing station. On the other hand, optical repeaters are connected to a submarine cable at fixed intervals, and an optical amplifier included in an optical repeater amplifies signal light intensity. A frequency distribution of signal light intensity in the amplified signal becomes uneven due to device variation of the optical amplifiers. Accordingly, the signal light intensity is corrected in such a way as to be even by introducing an optical passive device called a fixed gain equalizer in part of the optical repeaters. Patent Literature 1 and Patent Literature 2 describe examples of such a submarine optical communication system.

A submarine optical communication system generally includes a failure monitoring means, and the failure monitoring means monitors occurrence of an optical repeater failure and a submarine cable failure by allocating monitor pulse signal light to a wavelength out of an accommodation band of communication signal light. Specifically, opposed optical fibers are connected at each optical repeater, and by looping back only the monitor pulse signal light, the failure source is narrowed down from a reception timing difference of return light at a landing station. Patent Literature 3 describes an example of such a failure monitoring means.

FIG. 16 is a block diagram illustrating an example of a configuration of a submarine optical communication system related to the aforementioned technology. As illustrated in FIG. 16, a submarine optical communication system 90 related to the aforementioned technology includes an optical path setting device 91, landing stations 92-1 and 92-2, submarine cable transmission lines 93-1 to 93-6, an optical repeater 94, and a fixed-gain-equalizing optical repeater 95. While a case of the submarine optical communication system 90 including two landing stations 92-1 and 92-2 and six submarine cable transmission lines 93-1 to 93-6 is described as an example, the numbers of landing stations and submarine cable transmission lines are not limited thereto.

In the following description, when components signs of which are accompanied by indices (such as −1 and −2) in devices or the like of the same type are collectively described, the indices of the signs are omitted.

The landing station 92 includes a submarine optical node device 920 and a submarine cable monitoring device 921. The optical repeater 94 includes optical amplifiers 940, an optical splitter 941, and an optical coupler 942. The fixed-gain-equalizing optical repeater 95 includes optical amplifiers 950, an optical splitter 951, an optical coupler 952, and fixed gain equalizers 953.

Next, an operation of accommodating required traffic on an optical path by the submarine optical communication system related to the aforementioned technology will be described.

With respect to an optical path by which required traffic is accommodated in the submarine optical communication system 90, the optical path setting device 91 determines optical path setting values such as a required wavelength slot count and an accommodation wavelength slot number, based on characteristics of the submarine optical cable transmission line 93, the optical repeater 94, and the fixed-gain-equalizing optical repeater. The submarine optical node device 920 transmits the optical path accommodating the required traffic, based on the optical path setting values.

By the operation described above, the submarine optical communication system 90 establishes the optical path accommodating the required service.

Next, an operation of monitoring occurrence of a failure in the submarine optical cable transmission lines 93, the optical repeater 94, and the fixed-gain-equalizing optical repeater 95 by the submarine optical communication system related to the aforementioned technology will be described.

The submarine cable monitoring device 921 transmits monitor pulse signal light at fixed intervals, and the submarine cable monitoring device 921 receives the pulse signal light looped back from the optical repeater 94 or the fixed-gain-equalizing optical repeater 95 again. A loopback point of the monitor pulse signal is identified from a reception time of the received pulse signal light. The pulse signal looped back from the failure source or beyond does not reach the landing station 92 after occurrence of the failure, and therefore the failure source can be narrowed down from the reception time.

By the operation described above, the submarine optical communication system 90 monitors occurrence of a failure and narrows down a failure source.

CITATION LIST

Patent Literature

Patent Literature 1: Japanese Unexamined Patent Application Publication No. H9-289494
Patent Literature 2: Japanese Unexamined Patent Application Publication No. 2001-144693
Patent Literature 3: Japanese Unexamined Patent Application Publication No. 2002-009701
Patent Literature 4: International Patent Publication No. WO 2011/030897

SUMMARY OF INVENTION

Technical Problem

Wavelength addition is generally used as a means for increasing submarine optical communication system capacity according to increase in communication traffic demand to a submarine optical communication system. Signal light with higher frequency utilization efficiency compared with that at introduction of a submarine optical communication system is often available in wavelength addition due to enhanced performance of signal light transmitter-receivers, and as a result, enhanced accommodation efficiency of the submarine optical communication system can be expected, and economical efficiency is provided in terms of per-bit cost reduction.

Technologies capable of accommodating high-capacity traffic with high frequency utilization efficiency in wavelength addition include an elastic optical communication technology (see Patent Literature 4, for example). An optical communication system employing the elastic optical communication technology can improve frequency utilization efficiency compared with an optical communication system using fixed grids, by changing an occupied wavelength slot count of an optical path according to an amount of optical signal quality degradation in an accommodation path. Furthermore, an optical transmitter-receiver supporting the elastic optical communication technology can transmit and receive an optical path an occupied slot count of which is variable according to an amount of optical signal quality degradation.

On the other hand, optimum input light intensity of existing signal light and that of added signal light do not necessarily match due to differences in frequency utilization efficiency and signal light power spectral density between the existing signal light and the added signal light. Even when existing signal light and added signal light are input to a submarine cable at the transmitting end after setting optimum light intensity to each, an amplified light intensity response at an optical amplifier may not necessarily be linear with respect to input signal light intensity, and as a result, a signal light intensity distribution deviates from the optimum value. Consequently, signal quality degradation occurs at the receiving end. Accordingly, in order to maximize a transmission characteristic of each beam of signal light, the input signal light intensity of each beam of the existing signal light and the added signal light needs to be re-set to an optimum value in the submarine cable as well.

A fixed gain equalizer related to the aforementioned technology cannot re-set a light intensity distribution compensation value after introduction of a submarine cable and therefore cannot set signal light intensity for added signal light to an optimum value in the submarine cable. As a result, transmission characteristic degradation from optimum light intensity occurs in the added signal light, and therefore a margin for the added signal light needs to be set to a larger value. In other words, there is a problem that an enhancement effect on frequency utilization efficiency of the added signal light is suppressed with increase in a required margin.

An object of the present disclosure is to provide a submarine optical communication system control device, a control method, and a readable medium for resolving at least one of the aforementioned problems. Specifically, the problem in a submarine optical communication system compensating for a light intensity distribution by a fixed gain equalizer that an enhancement effect on frequency utilization efficiency of added signal light is suppressed with increase in a required margin due to inability to set signal light intensity of the added signal light to an optimum value is resolved.

Solution to Problem

A submarine optical communication system control device according to the present disclosure includes: a light intensity distribution determination device configured to determine an optimum distribution of signal light intensity of an optical path from a value of one of a transmission characteristic of the optical path, frequency utilization efficiency, a signal light power spectral density, and a waveform distortion compensation setting, or a combination of values thereof; a light intensity distribution measuring device configured to measure a light intensity distribution of an optical path after transmission through a submarine cable transmission line; an equalization setting calculation unit configured to calculate a gain equalization setting for compensating for the difference between an optimum distribution in the light intensity distribution determination device and a measured distribution in the light intensity distribution measuring device; and a variable gain equalizer configured to compensate for a light intensity distribution of an optical path to the optimum distribution, based on a gain equalization setting in the equalization setting calculation unit.

A submarine optical communication system control method according to the present disclosure includes: determining an optimum distribution of signal light intensity of an optical path for each allocated frequency; measuring a light intensity distribution of an optical path after transmission through a submarine cable transmission line; calculating a gain equalization setting for compensating for the difference between an optimum distribution of a light intensity distribution and a measured distribution of an optical path after transmission; and compensating for a light intensity distribution of an optical path to the optimum distribution, based on the gain equalization setting.

A readable medium according to the present disclosure causes a computer to execute: a light intensity distribution determination procedure for determining an optimum distribution of signal light intensity of an optical path for each allocated frequency; an equalization setting calculation procedure for calculating a gain equalization setting for compensating for the difference between the optimum distribution and a measured distribution of light intensity measured for an optical path after transmission through a submarine cable transmission line; and an equalization setting notification procedure for notifying a setting for compensating for a light intensity distribution of an optical path to the optimum distribution, based on a gain equalization setting in the equalization setting calculation procedure.

Advantageous Effects of Invention

A submarine optical communication system control device, a submarine optical communication system control method, and a readable medium according to the present disclosure can suppress transmission characteristic degradation and enhance utilization efficiency of the submarine optical communication system by setting input signal light intensity to an optimum value by controlling a gain equalizer, based on a measured value of the signal light intensity in a submarine cable transmission line, even for a plurality of beams of signal light having different optimum values of input signal light intensity in the submarine optical communication system.

DESCRIPTION OF EMBODIMENTS

Example embodiments of the present invention will be described below with reference to drawings.
Features of Present Invention
Prior to description of the example embodiments of the present invention, an outline of features of the present invention will be described first.

Figure 1:
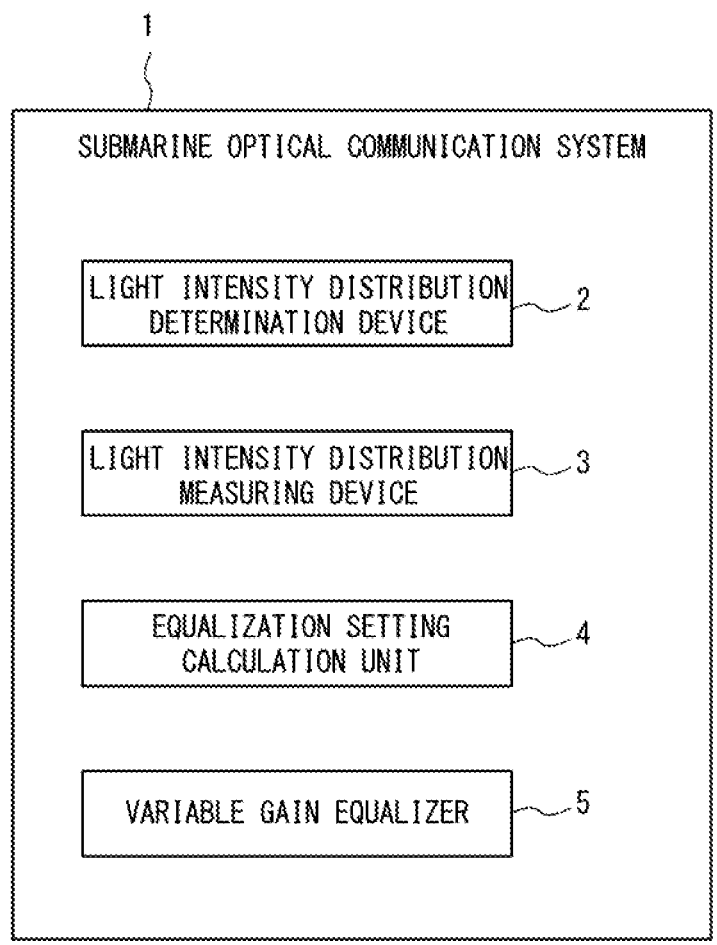
FIG. 1 is a diagram illustrating an outline of the present invention.

FIG. 1 is a diagram illustrating an outline of the present invention. As illustrated in FIG. 1, a submarine optical communication system control device 1 according to the present disclosure includes a light intensity distribution determination device 2, a light intensity distribution measuring device 3, an equalization setting calculation unit 4, and a variable gain equalizer 5. The light intensity distribution determination device 2 determines an optimum distribution of signal light intensity of an optical path from a value of one of a transmission characteristic of the optical path, frequency utilization efficiency, a signal light power spectral density, and a waveform distortion compensation setting, or a combination of values thereof. The light intensity distribution measuring device 3 measures a light intensity distribution of an optical path after transmission through a submarine cable transmission line. The equalization setting calculation unit 4 calculates a gain equalization setting for compensating for the difference between an optimum distribution in the light intensity distribution determination device and a measured distribution in the light intensity distribution measuring device. The variable gain equalizer 5 compensates for a light intensity distribution of an optical path to an optimum distribution, based on a gain equalization setting in the equalization setting calculation unit.

Thus, the submarine optical communication system control device 1 sets input signal light intensity to an optimum value by controlling the gain equalizer, based on a measured value of signal light intensity in the submarine cable transmission line, even for a plurality of beams of signal light having different optimum values of input signal light intensity in the submarine optical communication system. Consequently, transmission characteristic degradation can be suppressed, and utilization efficiency of the submarine optical communication system can be enhanced.

First Example Embodiment

Figure 2:
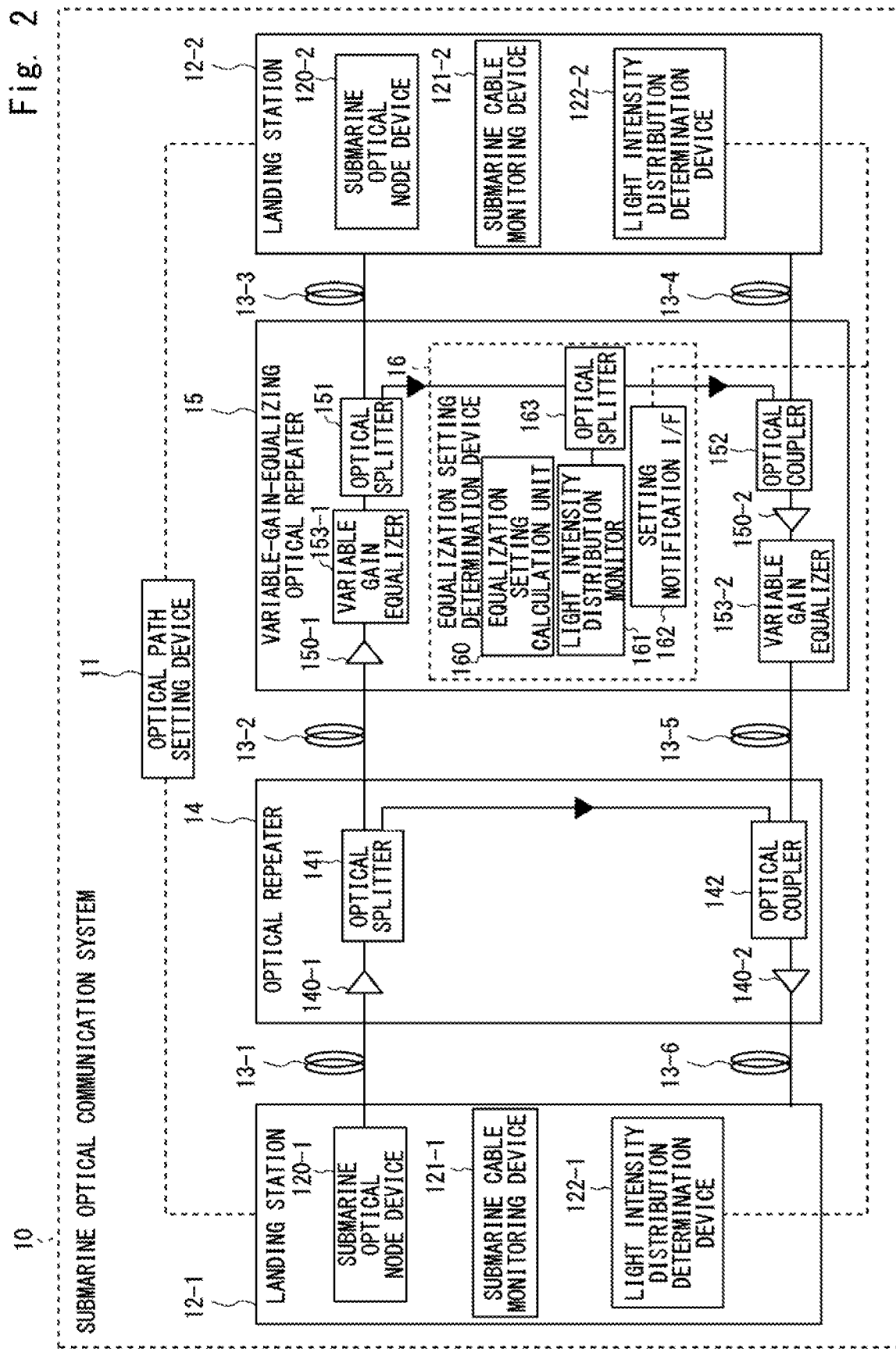
FIG. 2 is a block diagram illustrating a configuration of a submarine optical communication system control device according to a first example embodiment of the present invention.

A first example embodiment of the present invention will be described below. A submarine optical communication system 10 including a submarine optical communication system control device according to the first example embodiment will be described in the present example embodiment. FIG. 2 is a block diagram illustrating a configuration of the submarine optical communication system 10 according to the first example embodiment of the present invention. As illustrated in FIG. 2, the submarine optical communication system 10 includes an optical path setting device 11, landing stations 12, submarine cable transmission lines 13, an optical repeater 14, and a variable-gain-equalizing optical repeater 15.

Figure 3:
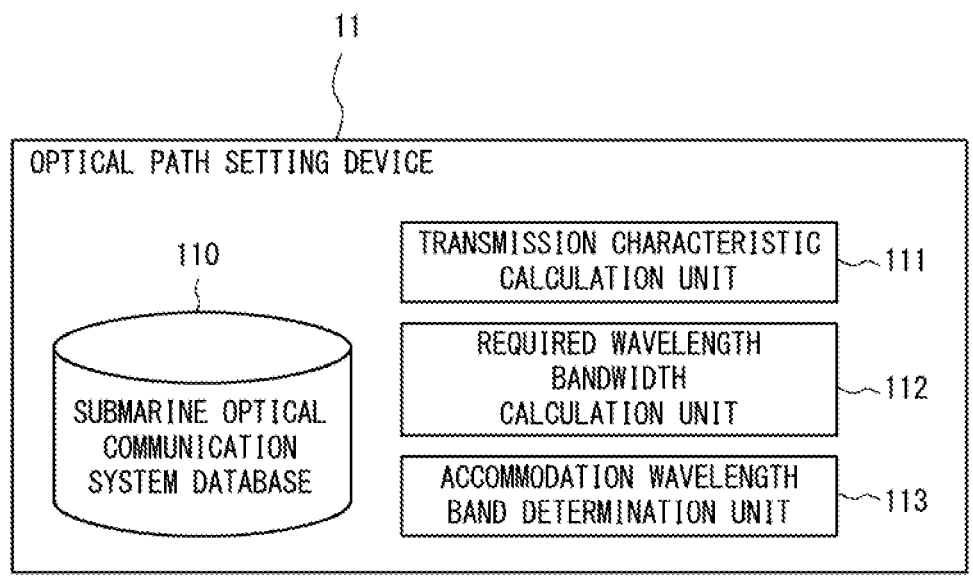
FIG. 3 is a block diagram illustrating a configuration of an optical path setting device according to the first example embodiment of the present invention.

FIG. 3 is a block diagram illustrating a configuration of the optical path setting device 11 according to the first example embodiment of the present invention. As illustrated in FIG. 3, the optical path setting device 11 includes a submarine optical communication system database 110, a transmission characteristic calculation unit 111, a required wavelength bandwidth calculation unit 112, and an accommodation wavelength band determination unit 113.

The submarine optical communication system database 110 stores information about a transmission characteristic in the submarine optical communication system and an allocated wavelength band of an optical path accommodated in the submarine optical communication system and updates the information when an optical path is allocated. With regard to an optical path accommodating required traffic, the transmission characteristic calculation unit 111 refers to the submarine optical communication system database 110 and calculates a transmission characteristic between the landing stations 12. Based on the transmission characteristic between the landing stations, the required wavelength bandwidth calculation unit 112 determines a required wavelength bandwidth being a wavelength bandwidth satisfying reachability of the optical path. Then, the accommodation wavelength band determination unit 113 determines a wavelength band capable of accommodating an optical path having the required wavelength bandwidth to be an accommodation wavelength band of the optical path.

Referring to FIG. 2 again, the landing station 12 includes a submarine optical node device 120, a submarine cable monitoring device 121, and a light intensity distribution determination device 122. The submarine optical node device 120 establishes an optical path accommodated in an accommodation wavelength band notified by the optical path setting device 11. The submarine cable monitoring device 121 transmits monitor pulse signal light at fixed intervals, receives the pulse signal light looped back from the optical repeater 14 or the variable-gain-equalizing optical repeater 15 by the submarine cable monitoring device 121 again, and identifies a loopback point of the monitor pulse signal from a reception time of the received pulse signal light. The light intensity distribution determination device 122 determines an optimum distribution of signal light intensity of an optical path from a value of one of a transmission characteristic of the optical path, frequency utilization efficiency, a signal light power spectral density, and a waveform distortion compensation setting, or a combination of values thereof and notifies the optimum distribution to the variable-gain-equalizing optical repeater 15.

The submarine cable transmission line 13 accommodates an optical path, and opposed landing stations are connected through a plurality of submarine cable transmission lines 13. The optical repeater 14 includes optical amplifiers 140, an optical splitter 141, and an optical coupler 142. The optical repeater 14 amplifies signal light intensity of an optical path and compensates for signal light intensity loss in the submarine cable transmission line 13.

The variable-gain-equalizing optical repeater 15 includes optical amplifiers 150, an optical splitter 151, an optical coupler 152, variable gain equalizers 153, and an equalization setting determination device 16. While amplifying signal light intensity of an optical path and compensating for signal light intensity loss in the submarine cable transmission line 13, the variable-gain-equalizing optical repeater 15 compares a setting value of a light intensity distribution with a measured value of the light intensity distribution by the equalization setting determination device 16 and by setting a gain equalization setting value determined based on the difference to the variable gain equalizer 153, compensates for the signal light intensity distribution of the optical path to the setting value.

The equalization setting determination device 16 includes an equalization setting calculation unit 160, a light intensity distribution monitor 161, a setting notification I/F 162, and an optical splitter 163. The equalization setting determination device 16 compares, by the equalization setting calculation unit 160, a measured value of a light intensity distribution in the light intensity distribution monitor 161 with a desired light intensity distribution notified through the setting notification I/F 162, calculates a gain equalization setting for compensating for the difference, and notifies and applies the calculated equalization setting value to the variable gain equalizer 153. The light intensity distribution monitor 161 is configured with a center frequency variable optical filter and a light intensity measuring instrument.

Figure 4A:
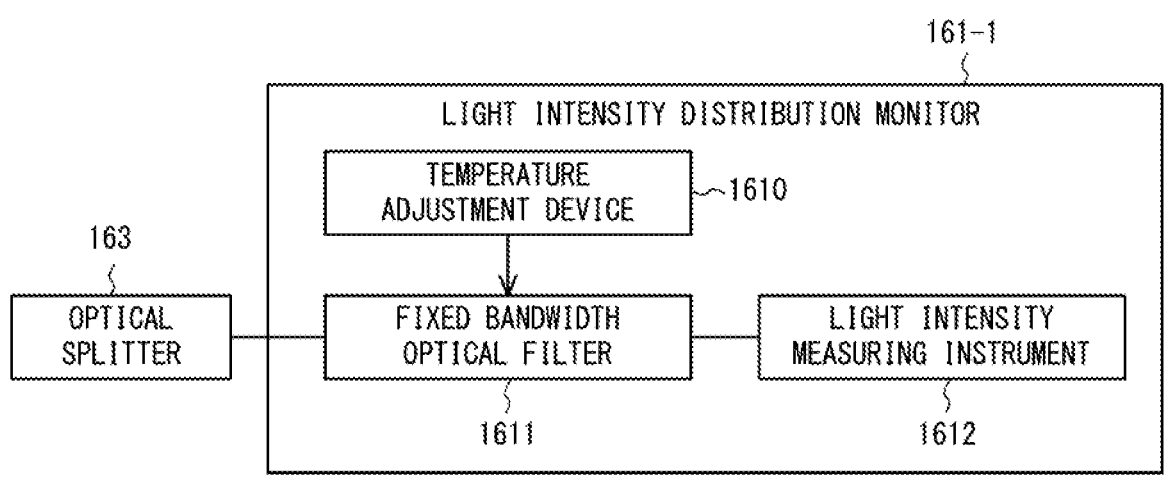
FIG. 4A is a block diagram illustrating an example of a configuration of a light intensity distribution monitor according to the first example embodiment of the present invention.

As an example of a specific configuration of the light intensity distribution monitor 161, FIG. 4A illustrates a configuration for shifting a center frequency of a fixed bandwidth optical filter by temperature control. A light intensity distribution monitor 161-1 includes a temperature adjustment device 1610, a fixed bandwidth optical filter 1611, and a light intensity measuring instrument 1612. In other words, the light intensity distribution monitor 161 included in the equalization setting determination device 16 functions as a light intensity distribution measuring device measuring a light intensity distribution of an optical path after transmission through the submarine cable transmission line 13, in the present example embodiment.

Figure 4B:
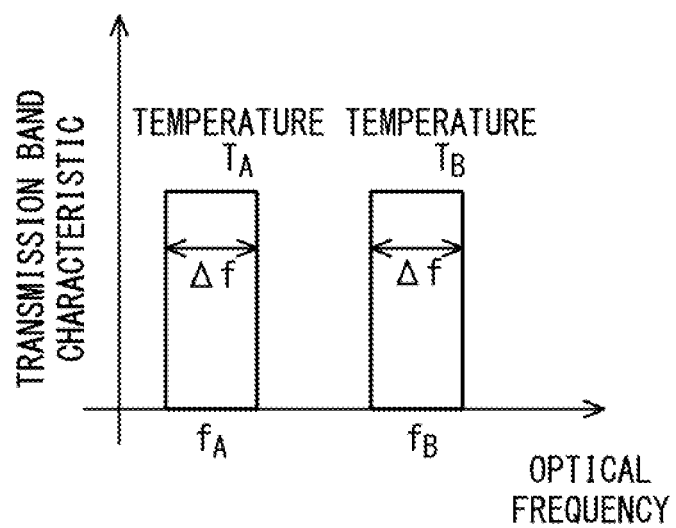
FIG. 4B is a diagram illustrating an example of a transmission band characteristic of a fixed bandwidth optical filter according to the first example embodiment of the present invention.

FIG. 4B illustrates a transmission band characteristic of the fixed bandwidth optical filter 1611. As illustrated in FIG. 4B, while center frequencies $f_A$ and $f_B$ can be varied by the temperature adjustment device 1610, a bandwidth Δf is constant at temperatures ($T_A$, $T_B$).

Figure 4C:
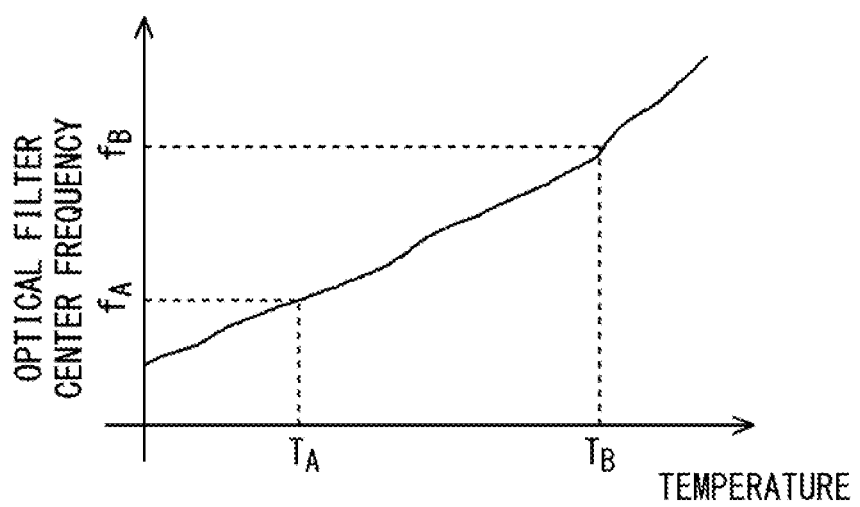
FIG. 4C is a diagram illustrating an example of a temperature characteristic of a center frequency of the fixed bandwidth optical filter according to the first example embodiment of the present invention.

FIG. 4C illustrates an example of changes in a center frequency of a transmission band (an optical filter center frequency) when an operating temperature of the fixed bandwidth optical filter is changed by the temperature adjustment device 1610. The center frequency increases monotonically with respect to the temperature ($f_A < f_B$ and $T_A < T_B$ in FIG. 4C), and therefore the center frequency can be uniquely selected by changing the temperature.

Figure 4D:
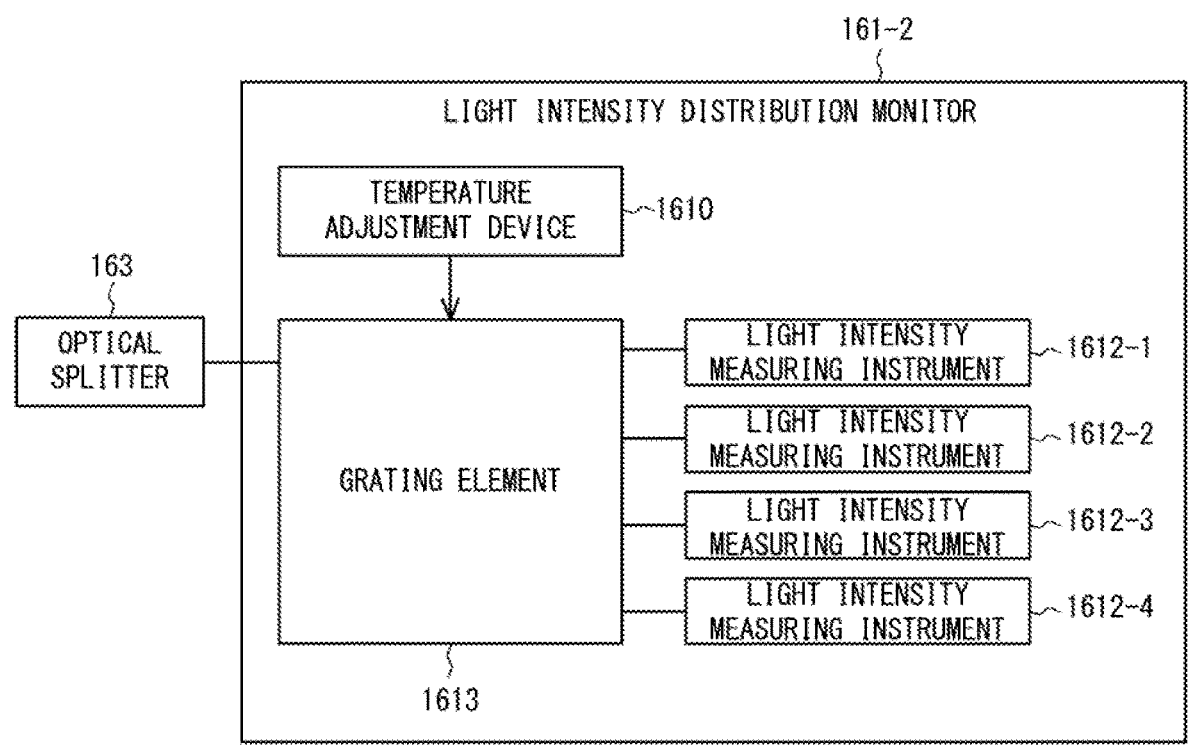
FIG. 4D is a block diagram illustrating an example of a configuration of a light intensity distribution monitor according to the first example embodiment of the present invention.
Figure 4E:
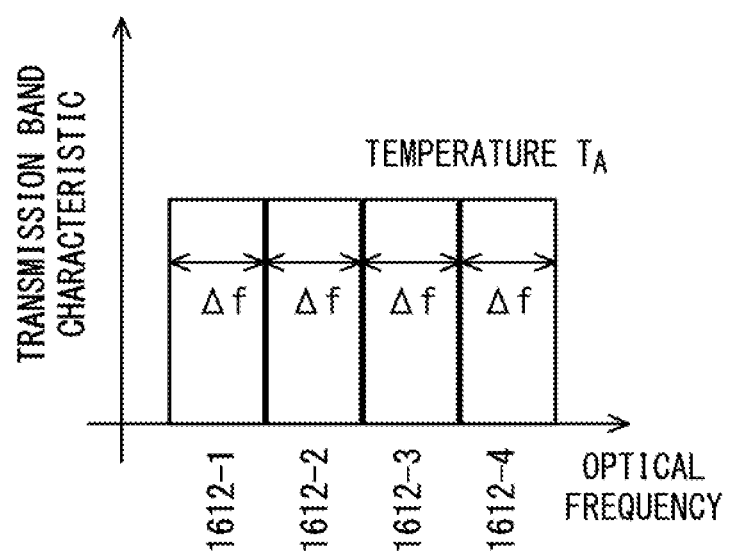
FIG. 4E is a diagram illustrating an example of a transmission band characteristic of the fixed bandwidth optical filter according to the first example embodiment of the present invention.

As illustrated as another configuration example of the light intensity distribution monitor 161 in FIG. 4D, a light intensity distribution monitor 161-2 includes a temperature adjustment device 1610, light intensity measuring instruments 1612-1 to 1612-4, and a grating element 1613. The light intensity distribution monitor 161-2 measures diffracted light from the grating element 1613 by use of the plurality of light intensity measuring instruments 1612-1 to 1612-4 and monitors a light intensity distribution by adjusting center frequencies by the temperature adjustment device 1610, as illustrated in FIG. 4E. A value of a bandwidth Δf may be changed for each of the light intensity measuring instruments 1612-1 to 1612-4 in the grating element 1613.

As yet another configuration example of the light intensity distribution monitor 161, a configuration using a liquid crystal on silicon (LCOS) based wavelength selective switch configuration and an optical spectrum analyzer may also be considered.

Figure 5:
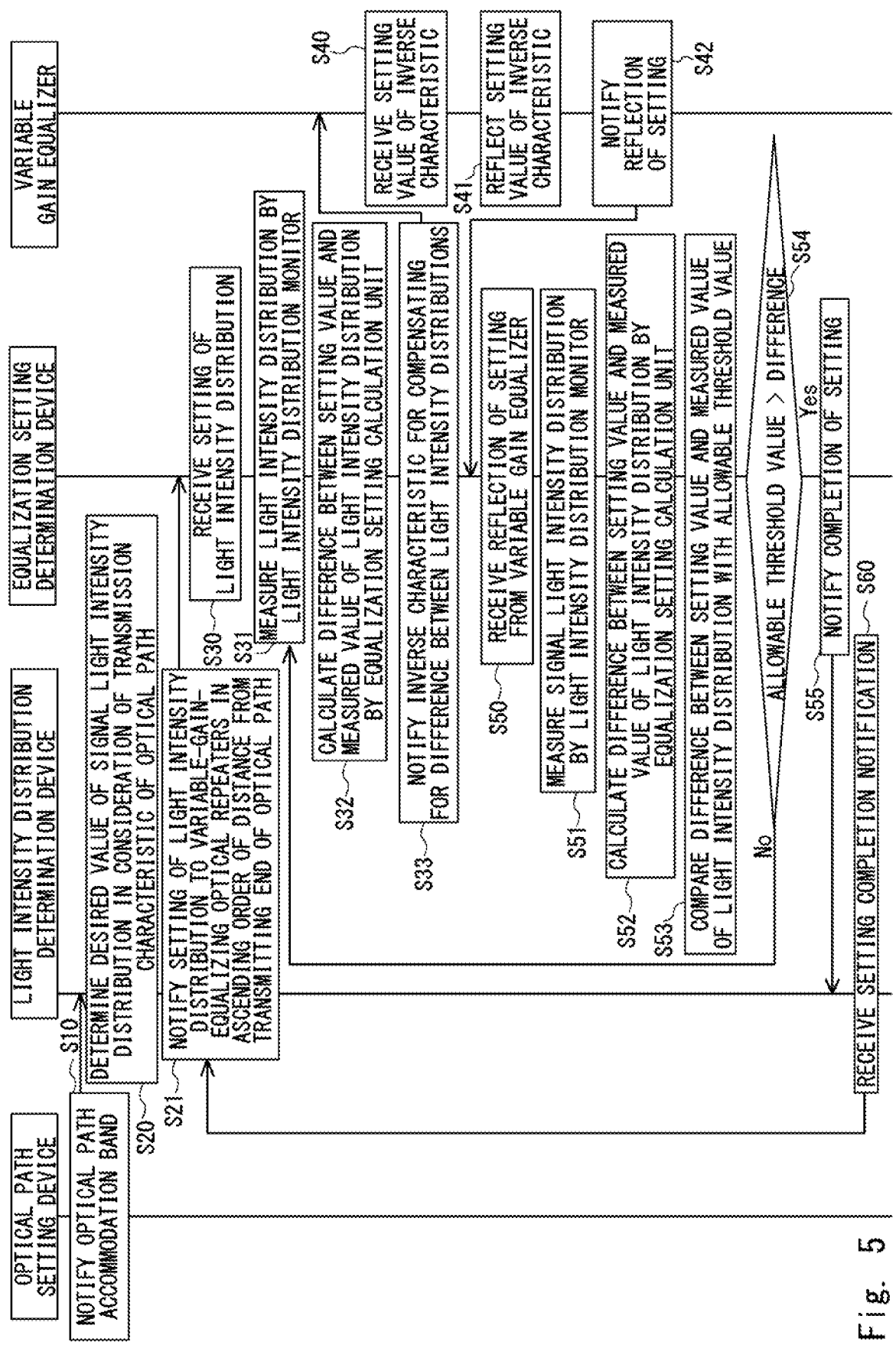
FIG. 5 is a sequence diagram for illustrating an operation of the submarine optical communication system control device according to the first example embodiment of the present invention.

Next, a submarine optical communication system control method according to the present example embodiment will be described. FIG. 2 is referred to as appropriate in the following description. FIG. 5 illustrates a processing flow of the submarine optical communication system control method according to the present example embodiment.

With regard to the submarine optical communication system control method according to the present example embodiment, first, the optical path setting device 11 notifies an optical path accommodation band (Step S10).

Next, based on the notified optical path accommodation band, a desired value of a signal light intensity distribution is determined in consideration of a transmission characteristic of the optical path (Step S20). Specifically, based on the notified optical path accommodation band, the light intensity distribution determination device 122 determines a signal light intensity distribution of the optical path from a value of one of a transmission characteristic related to received signal quality of the optical path, frequency utilization efficiency, a signal light power spectral density, and a waveform distortion compensation setting, or a combination of values thereof. The transmission characteristic related to received signal quality is calculated based on a bit error rate (BER) or an error vector magnitude (EVM), a distribution Q-factor, and an optical signal-to-noise ratio for signal light intensity of the optical path. An actual measured value in the submarine optical communication system or a calculated value acquired by a transmission simulation is used as the transmission characteristic. Based on signal light intensity and a transmission characteristic of a reference optical path, an optimum value of signal light intensity of an optical path to be opened is calculated from a value of one of a transmission characteristic of the optical path, frequency utilization efficiency, a signal light power spectral density, and a waveform distortion compensation setting, or a combination of values thereof. A submarine optical node device 120-1 opens the optical path after setting signal light intensity of the optical path to the optimum value.

Next, after the submarine optical node device 120-1 opens the optical path, setting of a light intensity distribution is notified to one or more of the variable-gain-equalizing optical repeaters 15 in ascending order of distance from the transmitting end of the optical path (Step S21). Specifically, a light intensity distribution determination device 122-1 notifies a setting value of a light intensity distribution to the equalization setting determination device 16 included in the variable-gain-equalizing optical repeater 15.

Next, after the light intensity distribution setting is received through the setting notification I/F 162 included in the equalization setting determination device 16 (Step S30), the light intensity distribution monitor 161 measures an output signal light intensity distribution of the variable gain equalizer 153-1 at a set bandwidth at fixed frequency intervals (Step S31). It is desirable that a sweep frequency interval in the light intensity distribution monitor 161 be equal to or less than the minimum value of a center frequency interval of the optical path accommodated in the submarine cable transmission line 13.

Subsequently, the equalization setting calculation unit 160 calculates the difference between the notified light intensity distribution setting value and the measured value (Step S32). Crosstalk from adjacent channel signal light may cause degraded precision of a measured value by the light intensity distribution monitor in a submarine optical communication system based on the wavelength division multiplexing technique. With the aim of preventing the degraded precision, the equalization setting calculation unit 160 calculates the difference, based on a value acquired by multiplying a weighting factor by each of a plurality of notified measured light intensity distribution values and then taking the linear sum of the resulting values. The weighting factor is determined from a light intensity distribution setting value of each beam of channel signal light in the submarine optical communication system based on the wavelength division multiplexing technique and a transmission band characteristic in the light intensity distribution monitor. Next, the equalization setting calculation unit 160 calculates an inverse characteristic for compensating for the difference between the signal light intensity distributions and notifies the setting to the variable gain equalizer 153-1 (Step S33).

Subsequently, after receiving the inverse characteristic setting (Step S40), the variable gain equalizer 153-1 reflects the inverse characteristic setting (Step S41). After reflection of the setting, the reflection of the setting is notified to the equalization setting determination device 16 through the setting notification I/F 162 (Step S42).

Subsequently, after the equalization setting determination device 16 receives the notification of the reflection of the setting (Step S50), the light intensity distribution monitor 161 measures a signal light intensity distribution (Step S51), and the equalization setting calculation unit 160 calculates the difference between the setting value and the measured value of the light intensity distribution (Step S52). Then, the difference between the setting value and the measured value is compared with an allowable threshold value (Step S53).

When the difference between the setting value and the measured value falls below the allowable threshold value in Step S54 (in the case of YES), a setting completion notification is transmitted to the light intensity distribution determination device 122-1 included in the light intensity distribution determination device 122 (Step S55). Then, after receiving the setting completion notification from the equalization setting determination device 16, the light intensity distribution determination device 122 notifies setting of a light intensity distribution to a variable-gain-equalizing optical repeater 15 next closest to the transmitting end of the optical path (Step S60). On the other hand, when the difference between the setting value and the measured value is equal to or greater than the allowable threshold value in Step S54 (in the case of NO), the procedures are repeated from Step S31. The aforementioned processing in and after Step S21 is executed at the next closest variable-gain-equalizing optical repeater to which setting of a light intensity distribution is notified by the processing in Step S60. Then the procedures described above are repeated until a light intensity distribution is set to every variable-gain-equalizing optical repeater 15.

As described above, the equalization setting determination device 16 may measure a signal light intensity distribution and re-set the signal light intensity distribution when the difference from a setting value exceeds the allowable threshold value, not only during opening of an optical path but also during periodic maintenance, failure recovery, and/ or the like.

Figure 6:
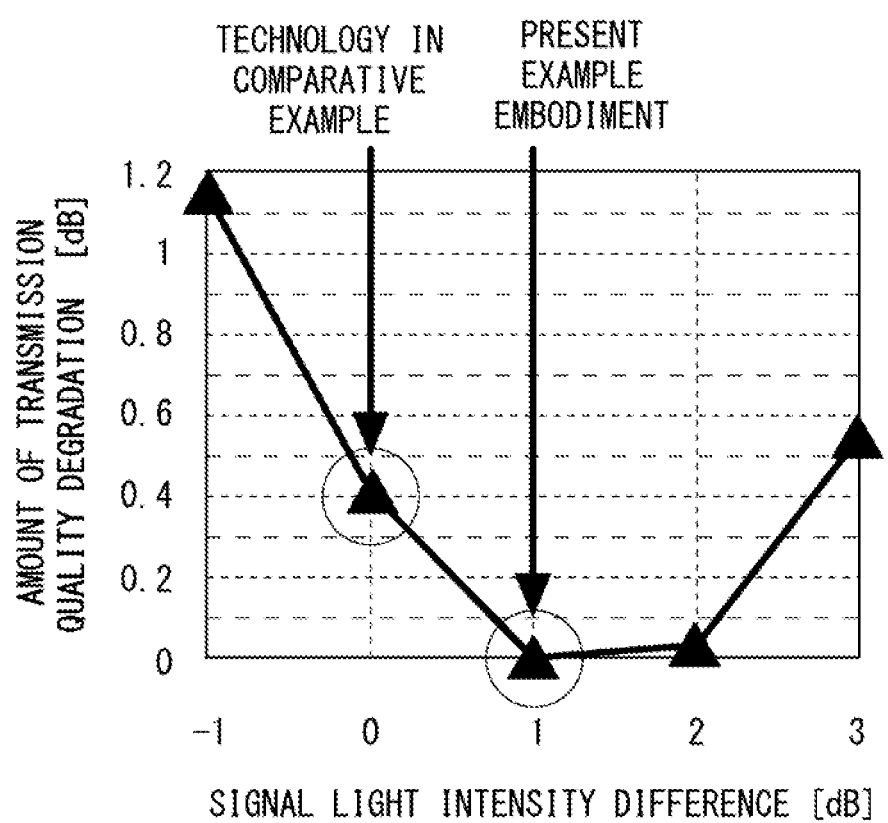
FIG. 6 is a diagram illustrating a calculation example of an optimum value of signal light intensity of an optical path to be opened in a submarine optical communication system including the submarine optical communication system control device according to the first example embodiment of the present invention.

FIG. 6 illustrates a calculation example of an optimum value of signal light intensity of an optical path in the processing in Step S20 in FIG. 5. In FIG. 6, optimum values are calculated by a transmission simulation in a case of the total length of the submarine cable transmission line 13 being 9,000 km and optical repeaters 14 being introduced every 60 km. Specifically, a result of evaluating an amount of quality degradation in a transmission characteristic from an optimum value with respect to signal light intensity of the optical path is illustrated. It is understood from the calculation example that a condition of increasing signal light intensity from a reference value by 1 dB is optimum.

Accordingly, it is understood that increase in signal light intensity from the reference value by 1 dB by the optical communication system control device according to the present example embodiment can improve an amount of transmission quality degradation by 0.4 dB compared with a technology related to a comparative example.

Figure 7:
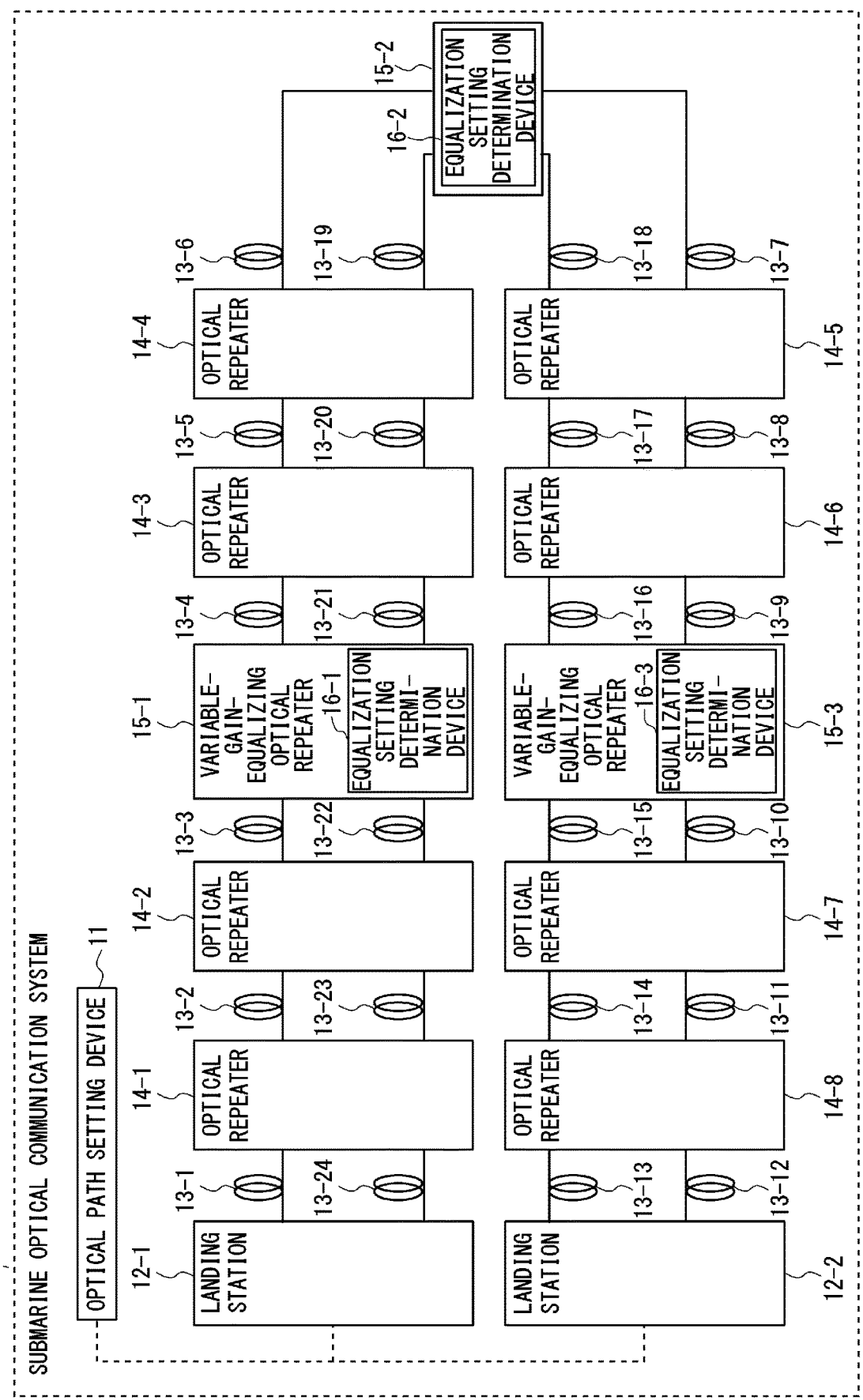
FIG. 7 is a block diagram illustrating another configuration of the submarine optical communication system including the submarine optical communication system control device according to the first example embodiment of the present invention.

FIG. 7 is a block diagram illustrating a configuration of a related submarine optical communication system 17 including the submarine optical communication system control device according to the first example embodiment. As illustrated in FIG. 7, the submarine optical communication system 17 includes an optical path setting device 11, landing stations 12, submarine cable transmission lines 13, optical repeaters 14, variable-gain-equalizing optical repeaters 15, and equalization setting determination devices 16. When a plurality of variable-gain-equalizing optical repeaters 15-1 to 15-3 are included, a signal light intensity distribution is controlled by an equalization setting determination device 16 in ascending order of distance between a landing station at the transmitting end of an optical path and the variable-gain-equalizing optical repeater 15. Specifically, under a condition that the optical path is transmitted from the landing station 12-1, signal light intensity distributions are controlled in an order of the variable-gain-equalizing optical repeaters 15-1, 15-2, and 15-3.

Figure 8:
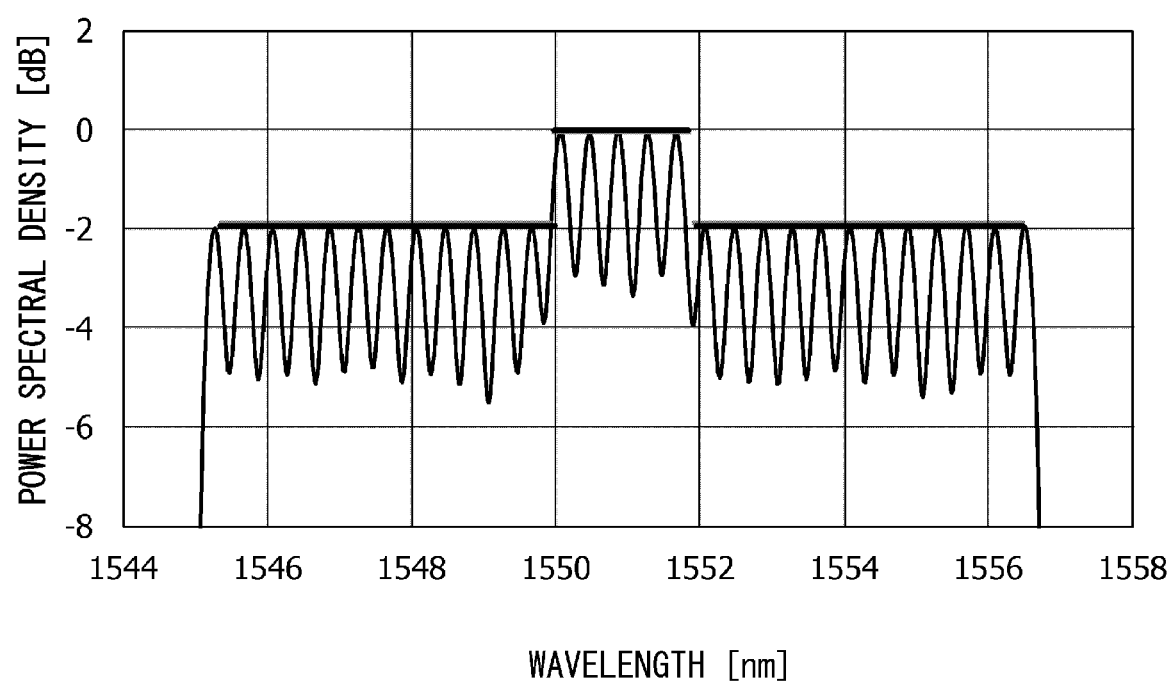
FIG. 8 is a diagram illustrating an example of a light intensity distribution of an optical path transmitted from a landing station 12 according to the first example embodiment of the present invention.

FIG. 8 illustrates an example of a light intensity distribution of an optical path transmitted from the landing station 12. The example illustrated in FIG. 8 is a light intensity distribution of signal light in which 29 optical paths are wavelength division multiplexed at intervals of 50 GHz. There is a condition that optimum signal light intensity of five optical paths in the center is higher by 2 dB compared with the other optical paths.

Figure 9:
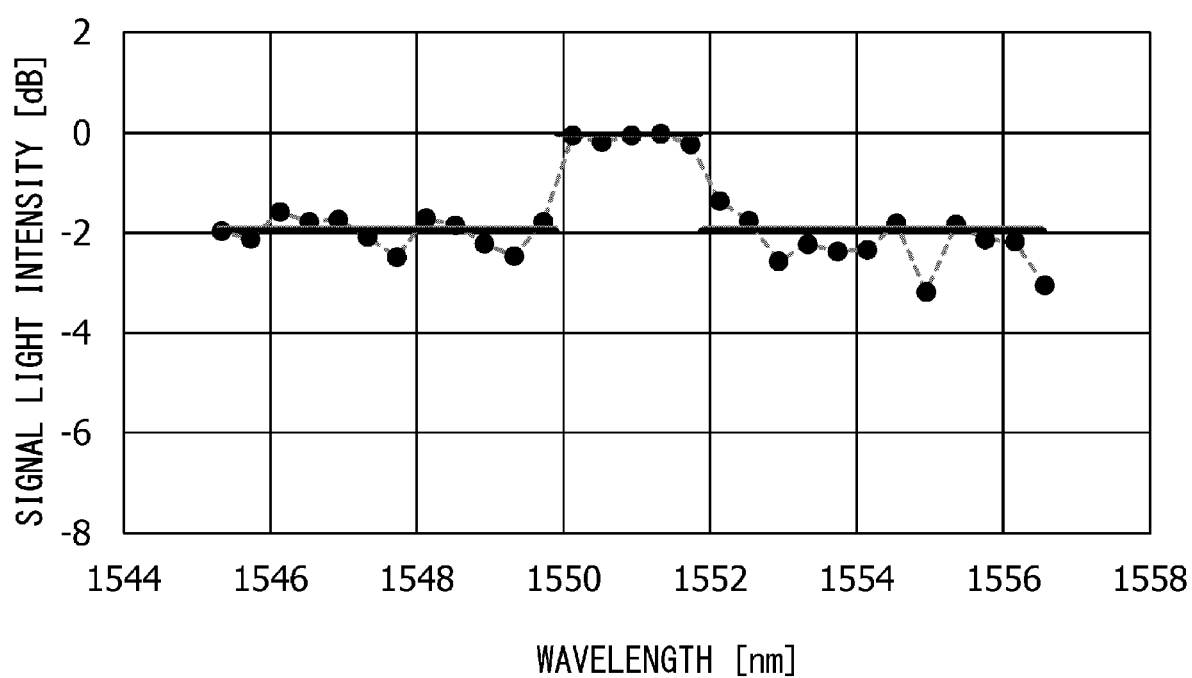
FIG. 9 is a diagram illustrating an example of a light intensity distribution of an optical path transmitted from the landing station according to the first example embodiment of the present invention.

FIG. 9 illustrates an example of a light intensity distribution of the signal light measured by the light intensity distribution monitor 161. The example illustrated in FIG. 9 is a result of measuring signal light intensity by the light intensity distribution monitor 161 at a 0.4 nm bandwidth at intervals of 50 GHz, similarly to the center frequency interval of the optical path.

Figure 10:
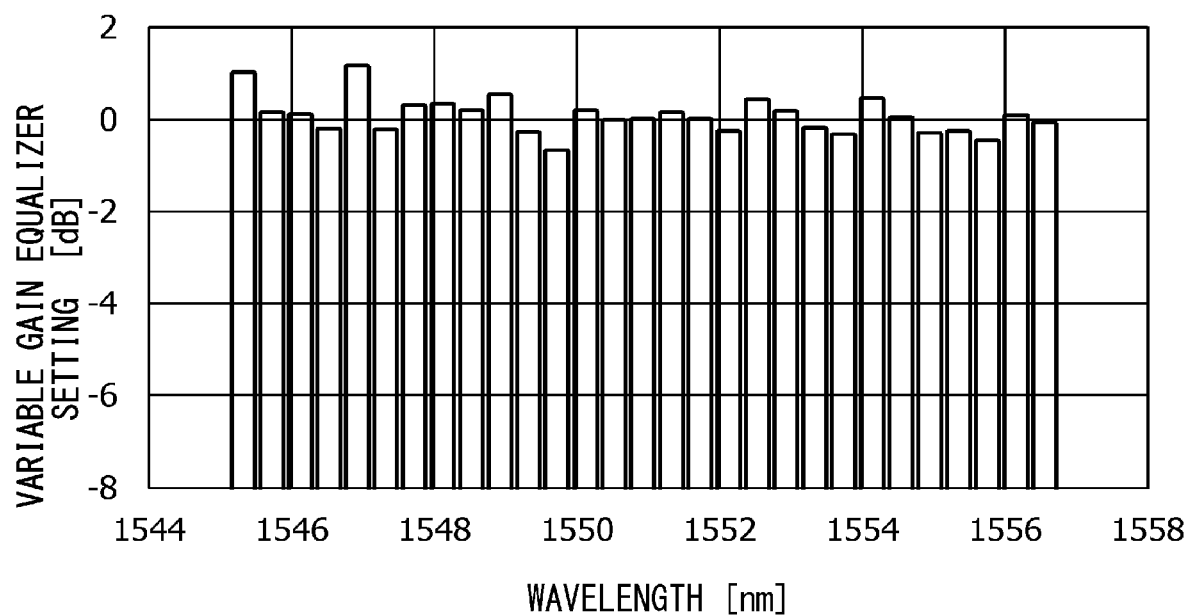
FIG. 10 is a diagram illustrating an example of a gain equalization setting value for a variable gain equalizer according to the first example embodiment of the present invention.

FIG. 10 illustrates an example of an inverse characteristic for compensating for the difference between a setting value and a measured value of a light intensity distribution, the inverse characteristic being calculated by the equalization setting calculation unit 160. The example illustrated in FIG. 10 is an inverse characteristic calculated from the difference between the light intensity distribution illustrated in FIG. 8 and the measured value of the light intensity distribution illustrated in FIG. 9. In order to compensate for the difference, the inverse characteristic illustrated in FIG. 10 is applied as a setting value of the variable gain equalizer 153-1.

Next, a method of detecting a failure in the equalization setting determination device 16 according to the present example embodiment will be described.

The submarine optical communication system 17 compares the difference between a measured distribution and a set distribution of light intensity at a landing station 12-2 at the receiving end, and with respect to a frequency at which the difference exceeds a predetermined failure threshold value, the equalization setting determination device 16 measures light intensity at the frequency. Further, with respect to an allocated frequency of an optical path at which received signal quality falls below a failure threshold value, the equalization setting determination device 16 may measure light intensity at the frequency. Occurrence of the failure is notified to a submarine cable monitoring device 121-1 assuming that a failure occurs in an equalization setting determination device 16 closer to the landing station 12-1 being the transmitting end out of equalization setting determination devices 16 in which the difference between measured light intensity and optimum light intensity exceeds a failure threshold value. By performing the aforementioned procedure at fixed time intervals, a failure in a equalization setting determination device 16 can be detected.

As described above, the submarine optical communication system 10 according to the present example embodiment can suppress transmission characteristic degradation and enhance utilization efficiency of the submarine optical communication system by setting input signal light intensity to an optimum value by controlling the gain equalizer, based on a measured value of signal light intensity in the submarine cable transmission line, even for a plurality of beams of signal light having different optimum values of input signal light intensity in the submarine optical communication system.

Second Example Embodiment

Next, a second example embodiment of the present invention will be described. The present example embodiment provides a configuration operating in such a way that a variable-gain-equalizing optical repeater measures a light intensity distribution, and after the measured light intensity distribution is notified to a landing station, a variable gain equalizer compensates for a light intensity distribution to a desired value, based on a gain equalization setting determined by an equalization setting determination device included in the landing station.

Figure 11:
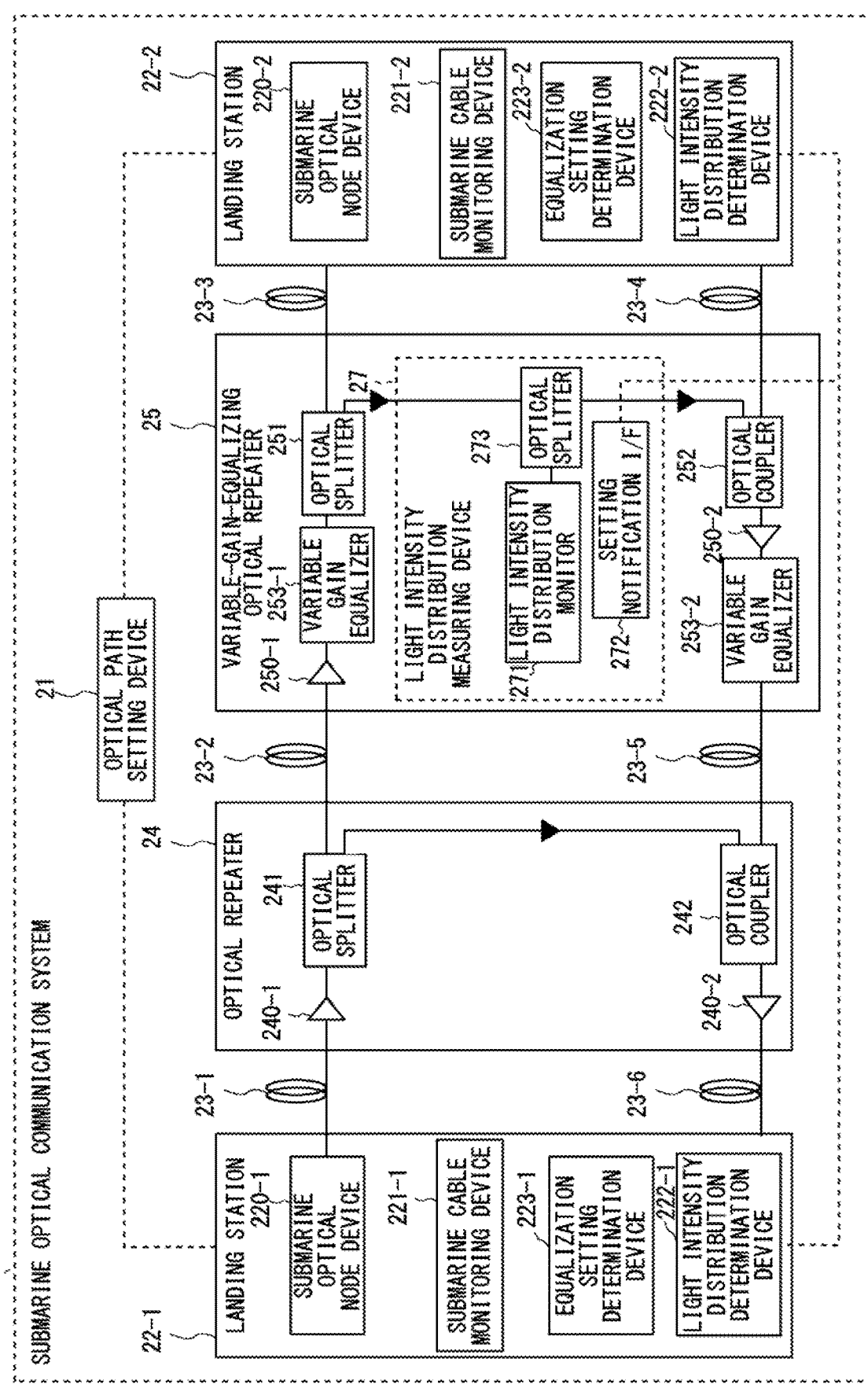
FIG. 11 is a block diagram illustrating a configuration of a submarine optical communication system control device according to a second example embodiment of the present invention.

A submarine optical communication system 20 including a submarine optical communication system control device according to the second example embodiment will be described in the present example embodiment. FIG. 11 is a block diagram illustrating a configuration of the submarine optical communication system 20 according to the second example embodiment of the present invention. The submarine optical communication system 20 includes an optical path setting device 21, landing stations 22, submarine cable transmission lines 23, an optical repeater 24, and a variable-gain-equalizing optical repeater 25.

The landing station 22 includes a submarine optical node device 220, a submarine cable monitoring device 221, a light intensity distribution determination device 222, and an equalization setting determination device 223. The optical repeater 24 includes optical amplifiers 240, an optical splitter 241, and an optical coupler 242. The variable-gain-equalizing optical repeater 25 includes optical amplifiers 250, an optical splitter 251, an optical coupler 252, variable gain equalizers 253, and a light intensity distribution measuring device 27. The light intensity distribution measuring device 27 includes a light intensity distribution monitor 271, a setting notification I/F 272, and an optical splitter 273.

Similarly to the submarine optical communication system 10 according to the first example embodiment, the submarine optical node device 220 establishes an optical path accommodated on an accommodation wavelength band notified by the optical path setting device 21. The submarine cable monitoring device 221 transmits monitor pulse signal light at fixed intervals, receives the pulse signal light looped back from the optical repeater 24 or the variable-gain-equalizing optical repeater 25 by the submarine cable monitoring device 221 again, and identifies a loopback point of the monitor pulse signal from a reception time of the received pulse signal light. The light intensity distribution determination device 222 determines an optimum distribution of signal light intensity of an optical path from a value of one of a transmission characteristic of the optical path, frequency utilization efficiency, a signal light power spectral density, and a waveform distortion compensation setting, or a combination of values thereof and notifies the optimum distribution to the variable-gain-equalizing optical repeater 25. The equalization setting determination device 223 calculates the difference between an optimum setting value of a light intensity distribution determined by the light intensity distribution determination device 222 and a light intensity distribution measured by the light intensity distribution measuring device 27 and after determining a setting value for compensating for the difference, notifies the setting value to the variable gain equalizer 253 through the setting notification I/F 272. While amplifying signal light intensity of an optical path and compensating for signal light intensity loss in the submarine cable transmission line 23, the variable-gain-equalizing optical repeater 25 compensates for a light intensity distribution to a setting value by setting up the variable gain equalizer 253, based on a gain equalization setting value for compensating for the difference between the setting value of the light intensity distribution notified by the equalization setting determination device 223 and a measured value. The light intensity distribution measuring device 27 notifies a measured value of a signal light intensity distribution in the light intensity distribution monitor 271 to the equalization setting determination device 223 through the setting notification I/F 272. In other words, the light intensity distribution monitor 271 included in the light intensity distribution measuring device 27 functions as a light intensity distribution measuring device measuring a light intensity distribution of an optical path after transmission through the submarine cable transmission line 23, in the present example embodiment.

Figure 12:
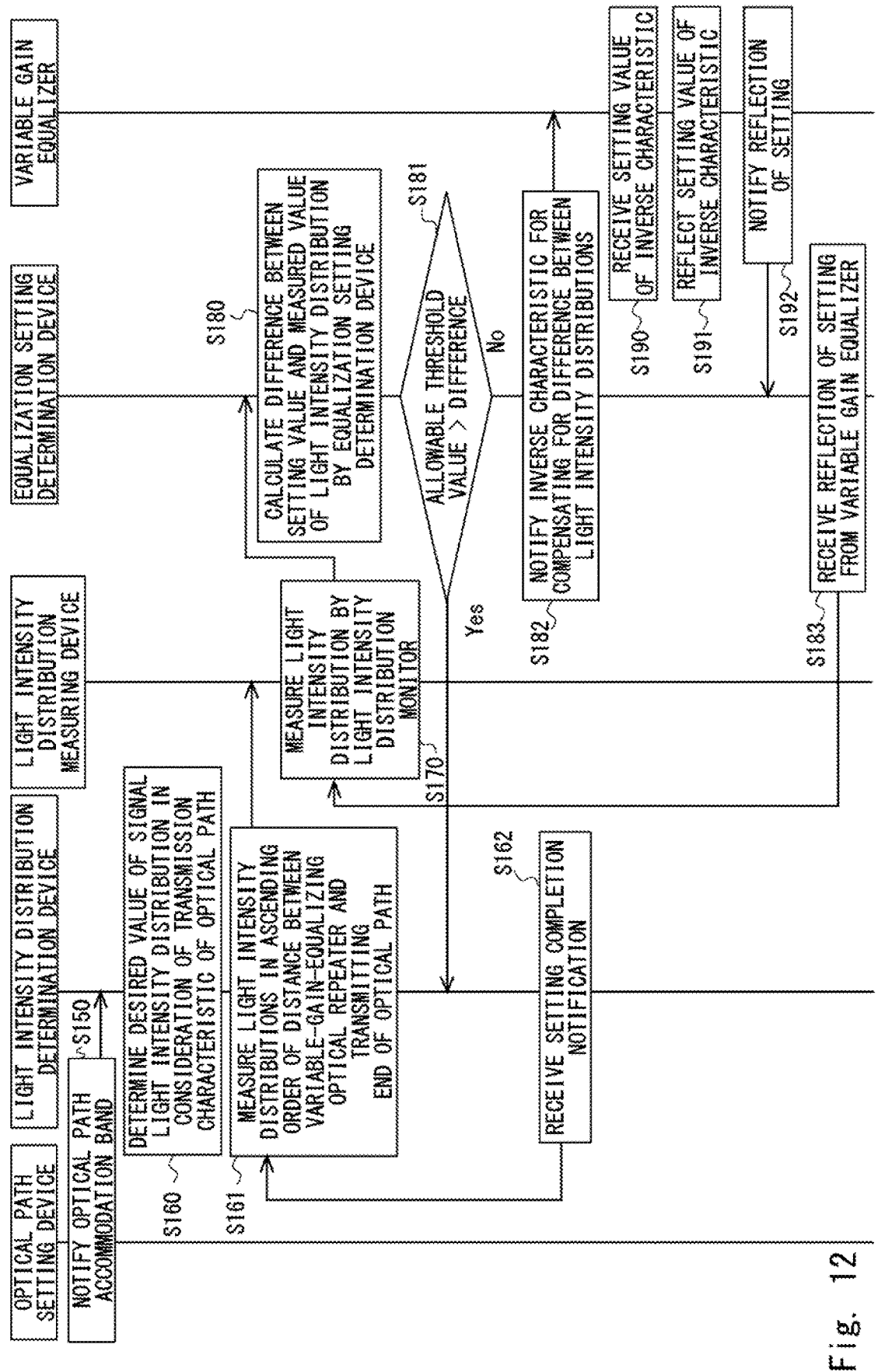
FIG. 12 is a sequence diagram for illustrating an operation of the submarine optical communication system control device according to the second example embodiment of the present invention.

Next, a submarine optical communication system control method according to the present example embodiment will be described. FIG. 11 is referred to as appropriate in the following description. FIG. 12 illustrates a processing flow of the submarine optical communication system control method according to the present example embodiment.

With regard to the submarine optical communication system control method according to the present example embodiment, first, the optical path setting device 21 notifies an optical path accommodation band (Step S150).

Next, based on the notified optical path accommodation band, the light intensity distribution determination device 222 determines a desired value of a signal light intensity distribution in consideration of a transmission characteristic of the optical path (Step S160). Specifically, based on the notified optical path accommodation band, the light intensity distribution determination device 222 determines a signal light intensity distribution of signal light intensity of the optical path from a value of one of a transmission characteristic of the optical path, frequency utilization efficiency, a signal light power spectral density, and a waveform distortion compensation setting, or a combination of values thereof. The transmission characteristic is calculated based on a bit error rate (BER) or an error vector magnitude (EVM), a distribution Q-factor, and an optical signal-to-noise ratio for signal light intensity of the optical path. An actual measured value in the submarine optical communication system or a calculated value acquired by a transmission simulation is used as the transmission characteristic. Based on signal light intensity and a transmission characteristic of a reference optical path, an optimum value of signal light intensity of an optical path to be opened is calculated from a value of one of a transmission characteristic of the optical path, frequency utilization efficiency, a signal light power spectral density, and a waveform distortion compensation setting, or a combination of values thereof. A submarine optical node device 220-1 opens the optical path after setting signal light intensity of the optical path to the optimum value.

Next, after the submarine optical node device 220-1 opens the optical path, measurement of a light intensity distribution is notified to one or more of the variable-gain-equalizing optical repeaters 25 in ascending order of distance from the transmitting end of the optical path (Step S161). Specifically, after the submarine optical node device 220-1 opens the optical path, a light intensity distribution determination device 222-1 notifies measurement of a light intensity distribution to the light intensity distribution measuring device 27.

Next, the light intensity distribution monitor 271 included in the light intensity distribution measuring device 27 measures output signal light intensity of a variable gain equalizer 253-1 at a set bandwidth at fixed frequency intervals and notifies the measured value of the light intensity distribution to an equalization setting determination device 223-1 (Step S170).

Next, the equalization setting determination device 223-1 calculates the difference between the setting value and the measured value of the light intensity distribution (Step S180) and determines whether the difference between the setting value and the measured value falls below an allowable threshold value (Step S181). When the difference between the setting value and the measured value falls below the allowable threshold value in Step S181 (in the case of YES), a setting completion notification is transmitted to the light intensity distribution determination device 222-1 (Step S162).

On the other hand, when the difference between the setting value and the measured value is equal to or greater than the allowable threshold value in Step S181 (in the case of NO), the equalization setting determination device 223-1 notifies an inverse characteristic for compensating for the difference between the light intensity distributions to the variable gain equalizer 253-1 (Step S182). Then, after receiving a setting value of the inverse characteristic (Step S190), the variable gain equalizer 253-1 reflects the setting value of the inverse characteristic (Step S191). After reflection of the setting, the reflection of the setting is notified to the equalization setting determination device 223-1 through the setting notification I/F 272 (Step S192). After the equalization setting determination device 223-1 receives the notification of the reflection of the setting (Step S183), the light intensity distribution monitor 271 included in a light intensity distribution measuring device 27 in a variable-gain-equalizing optical repeater 25 next closest to the transmitting end of the optical path measures a signal light intensity distribution (Step S170). Then, the procedures described above are repeated until a light intensity distribution is set to every variable-gain-equalizing optical repeater 25.

Inclusion of the equalization setting determination device 223 in the landing station 22 in the submarine optical communication system 20 according to the second example embodiment may enable simplification of the configuration of the variable-gain-equalizing optical repeater 25. As a result of simplification, reduced manufacturing cost, enhanced reliability, and reduced power consumption of the variable-gain-equalizing optical repeater 25 can be achieved. Further, supplying high power to a landing station 22 is easier than supplying the power to an optical repeater, and therefore an advantage that a calculation resource can be increased is provided.

As described above, the submarine optical communication system 20 according to the present example embodiment can suppress transmission characteristic degradation and enhance utilization efficiency of the submarine optical communication system by setting input signal light intensity to an optimum value by controlling the gain equalizer, based on a measured value of signal light intensity in the submarine cable transmission line, even for a plurality of beams of signal light having different optimum values of input signal light intensity in the submarine optical communication system.

Third Example Embodiment

Next, a third example embodiment of the present invention will be described. The present example embodiment provides a configuration operating in such a way that with respect to a plurality of submarine cable transmission line pairs, a light intensity distribution measuring device included in a variable-gain-equalizing optical repeater measures a light intensity distribution for each submarine cable transmission line, and an equalization setting determination device calculates a setting value of a variable gain equalizer for compensating for the difference between a setting value and a measured value of a light intensity distribution.

An optical communication system according to the present example embodiment will be described in detail below.

Figure 13:
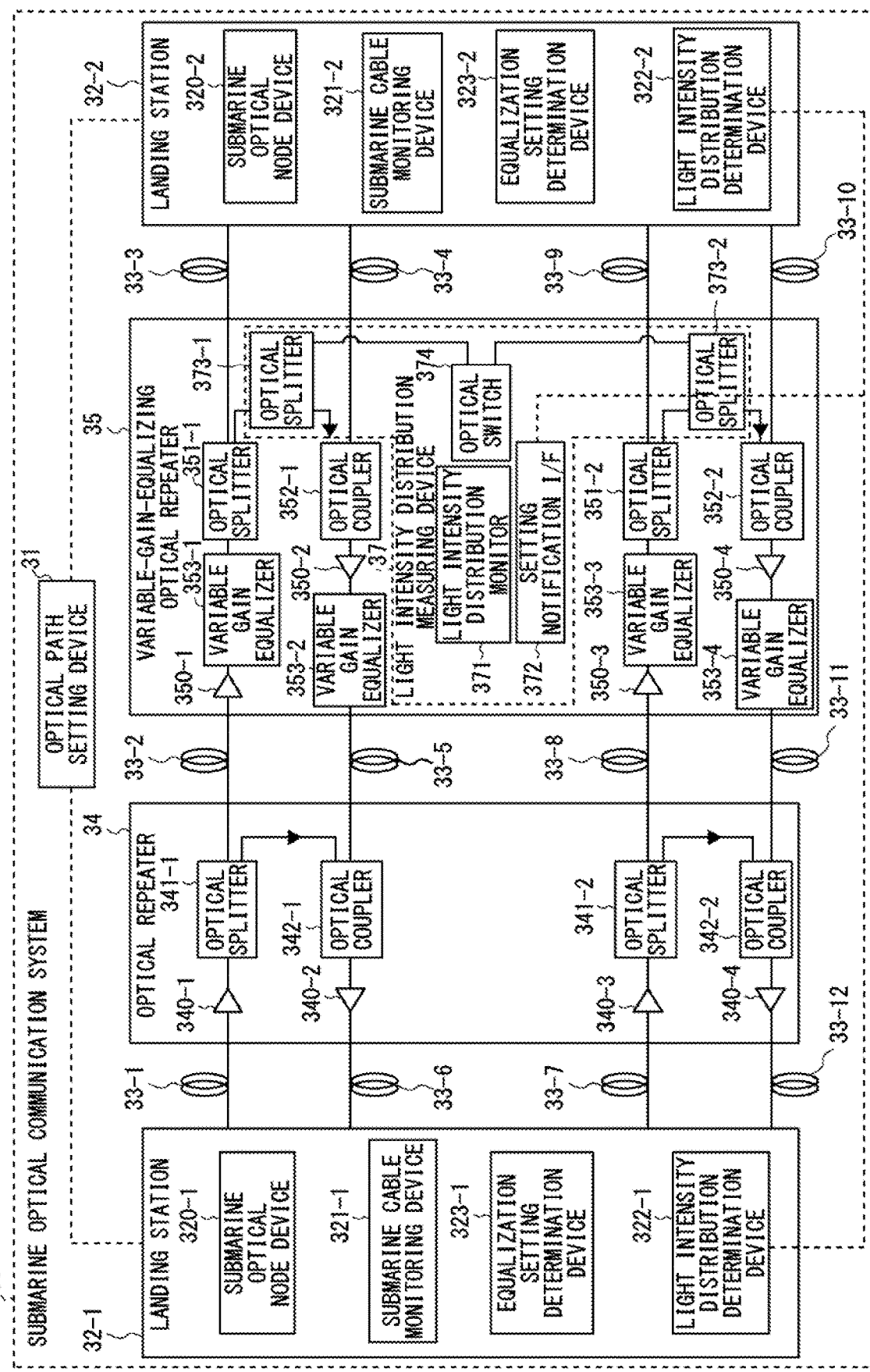
FIG. 13 is a block diagram illustrating a configuration of a submarine optical communication system control device according to a third example embodiment of the present invention.

A submarine optical communication system 30 including a submarine optical communication system control device according to the third example embodiment will be described in the present example embodiment. FIG. 13 is a block diagram illustrating a configuration of the submarine optical communication system 30 according to the third example embodiment of the present invention. The submarine optical communication system 30 includes an optical path setting device 31, landing stations 32, submarine cable transmission lines 33, an optical repeater 34, and a variable-gain-equalizing optical repeater 35.

The landing station 32 includes a submarine optical node device 320, a submarine cable monitoring device 321, a light intensity distribution determination device 322, and an equalization setting determination device 323. The optical repeater 34 includes optical amplifiers 340, optical splitters 341, and optical couplers 342 for the submarine cable transmission lines 33. The variable-gain-equalizing optical repeater 35 includes optical amplifiers 350, optical splitters 351, optical couplers 352, variable gain equalizers 353, and a light intensity distribution measuring device 37. The light intensity distribution measuring device 37 includes a light intensity distribution monitor 371, a setting notification I/F 372, optical splitters 373, and an optical switch 374.

Similarly to the submarine optical communication system 20 according to the second example embodiment, the submarine optical node device 320 establishes an optical path accommodated on an accommodation wavelength band for a submarine cable transmission line 33 notified by the optical path setting device 31. The submarine cable monitoring device 321 transmits monitor pulse signal light at fixed intervals, receives the pulse signal light looped back from the optical repeater 34 or the variable-gain-equalizing optical repeater 35 by the submarine cable monitoring device 321 again, and identifies a loopback point of the monitor pulse signal from a reception time of the received pulse signal light. The light intensity distribution determination device 322 determines an optimum distribution of signal light intensity of an optical path from a value of one of a transmission characteristic of the optical path, frequency utilization efficiency, a signal light power spectral density, and a waveform distortion compensation setting, or a combination of values thereof and notifies the optimum distribution to the variable-gain-equalizing optical repeater 35. The equalization setting determination device 323 calculates the difference between the optimum setting value of the light intensity distribution determined by the light intensity distribution determination device 322 and a light intensity distribution measured by the light intensity distribution measuring device 37 and after determining a setting value for compensating for the difference, notifies the setting value to the variable gain equalizer 353 through the setting notification I/F 372. While amplifying signal light intensity of an optical path and compensating for signal light intensity loss in the submarine cable transmission line 33, the variable-gain-equalizing optical repeater 35 compensates for a light intensity distribution to a setting value by setting up the variable gain equalizer 353, based on a gain equalization setting value for compensating for the difference between the setting value of the light intensity distribution notified by the equalization setting determination device 323 and a measured value. The light intensity distribution measuring device 37 selects an output light intensity distribution of a variable gain equalizer 353 being a measurement target by the optical switch 374 and then measures a signal light intensity distribution by the light intensity distribution monitor 371. In other words, the light intensity distribution monitor 371 included in the light intensity distribution measuring device 37 functions as a light intensity distribution measuring device measuring a light intensity distribution of an optical path after transmission through the submarine cable transmission line 33, in the present example embodiment. The measured value is notified to the equalization setting determination device 323 through the setting notification I/F 372.

Next, a submarine optical communication system control method according to the present example embodiment will be described.

Figure 14:
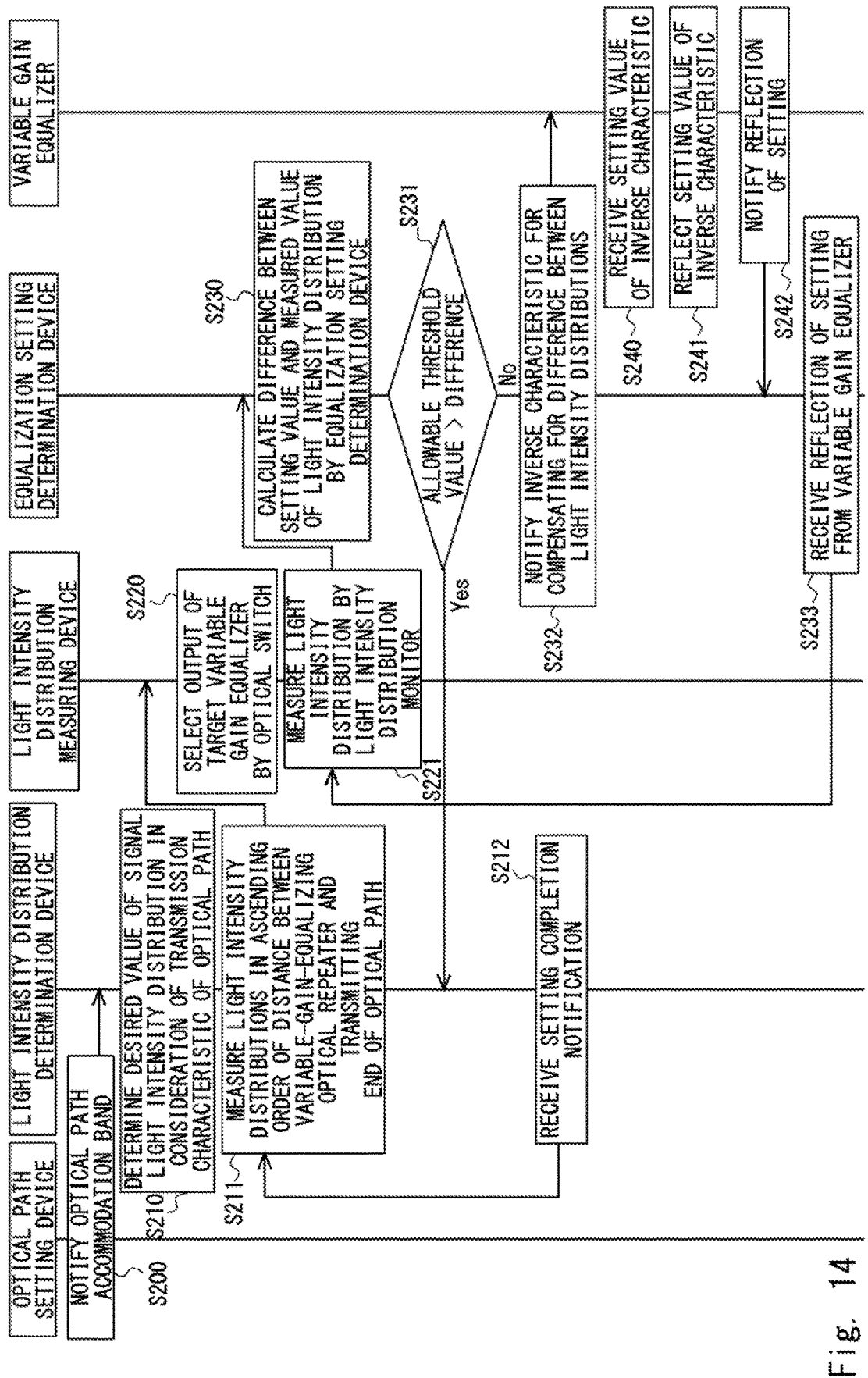
FIG. 14 is a sequence diagram for illustrating an operation of the submarine optical communication system control device according to the third example embodiment of the present invention.

FIG. 14 illustrates a sequence diagram for illustrating an operation of the submarine optical communication system control device according to the third example embodiment of the present invention. With regard to the submarine optical communication system control method according to the present example embodiment, first, the optical path setting device 31 notifies an optical path accommodation band for a target submarine cable transmission line 33 (Step S200).

Next, based on the notified optical path accommodation band, a desired value of a signal light intensity distribution is determined in consideration of a transmission characteristic of the optical path (Step S210). Specifically, based on the notified optical path accommodation band, the light intensity distribution determination device 322 determines a signal light intensity distribution of the optical path from a value of one of a transmission characteristic of the optical path, frequency utilization efficiency, a signal light power spectral density, and a waveform distortion compensation setting, or a combination of values thereof. The transmission characteristic is calculated based on a bit error rate (BER) or an error vector magnitude (EVM), a distribution Q-factor, and an optical signal-to-noise ratio for signal light intensity of the optical path. An actual measured value in the submarine optical communication system or a calculated value acquired by a transmission simulation is used as the transmission characteristic. Based on signal light intensity and a transmission characteristic of a reference optical path, an optimum value of signal light intensity of an optical path to be opened is calculated from a value of one of a transmission characteristic of the optical path, frequency utilization efficiency, a signal light power spectral density, and a waveform distortion compensation setting, or a combination of values thereof. A submarine optical node device 320-1 opens the optical path after setting signal light intensity of the optical path to the optimum value.

Next, after the submarine optical node device 320-1 opens the optical path, measurement of a light intensity distribution is notified to one or more of the variable-gain-equalizing optical repeaters 35 in ascending order of distance from the transmitting end of the optical path (Step S211). Specifically, after the submarine optical node device 320-1 opens the optical path, a light intensity distribution determination device 322-1 notifies measurement of a light intensity distribution to the light intensity distribution measuring device 37 included in the variable-gain-equalizing optical repeater 35.

Next, the optical switch 374 included in the light intensity distribution measuring device 37 selects the output of a target variable gain equalizer 353 (Step S220). Then, the light intensity distribution monitor 371 measures output signal light intensity at a set bandwidth at fixed frequency intervals (Step S221). The measured value of the light intensity distribution is notified to an equalization setting determination device 323-1 by the light intensity distribution measuring device 37.

Next, the equalization setting determination device 323-1 calculates the difference between the setting value and the measured value of the light intensity distribution, based on the measured value of the light intensity distribution (Step S230) and determines whether the difference between the setting value and the measured value falls below an allowable threshold value (Step S231). When the difference between the setting value and the measured value of the light intensity distribution falls below the allowable threshold value in Step S231 (in the case of YES), a setting completion notification is transmitted to the light intensity distribution determination device 322-1.

On the other hand, when the difference between the setting value and the measured value of the light intensity distribution is equal to or more than the allowable threshold value in Step S231 (in the case of NO), the equalization setting determination device 323-1 notifies an inverse characteristic for compensating for the difference between the light intensity distributions to the variable gain equalizer 353 (Step S232). Subsequently, after receiving a setting value of the inverse characteristic (Step S240), the variable gain equalizer 353 reflects the setting value of the inverse characteristic (Step S241). Then, after reflection of the setting, the variable gain equalizer 353 notifies the reflection of the setting to the equalization setting determination device 323-1 through the setting notification I/F 372 (Step S242). After the equalization setting determination device 323-1 receives the notification of the reflection of the setting (Step S243), the light intensity distribution monitor 371 included in the light intensity distribution measuring device 37 in a variable-gain-equalizing optical repeater 35 next closest to the transmitting end of the optical path measures a signal light intensity distribution (Step S240). Then the procedures described above are repeated until a light intensity distribution is set to every variable-gain-equalizing optical repeater 35.

Next, a correction method for aging of a frequency characteristic of the light intensity distribution measuring device 37 according to the present example embodiment will be described.

The optical switch 374 selects the output of a target variable gain equalizer 353, and the light intensity distribution monitor 371 measures output signal light intensity at a set bandwidth at fixed frequency intervals. A light intensity distribution is measured for the output of every variable gain equalizer 353, and the result is notified to the equalization setting determination device 323. For each variable gain equalizer 353 output, the equalization setting determination device 323 calculates an inverse characteristic compensating for a difference between an optimum value of light intensity distribution of an optical path, the optimum value being determined by the light intensity distribution determination device 322, and the measured value. The mean of the inverse characteristic is taken at frequency intervals for each variable gain equalizer 353 output, and the inverse characteristic is corrected based on the mean. The median, the mean excluding an outlier, or the median excluding an outlier may be used in place of the mean.

Figure 15A:
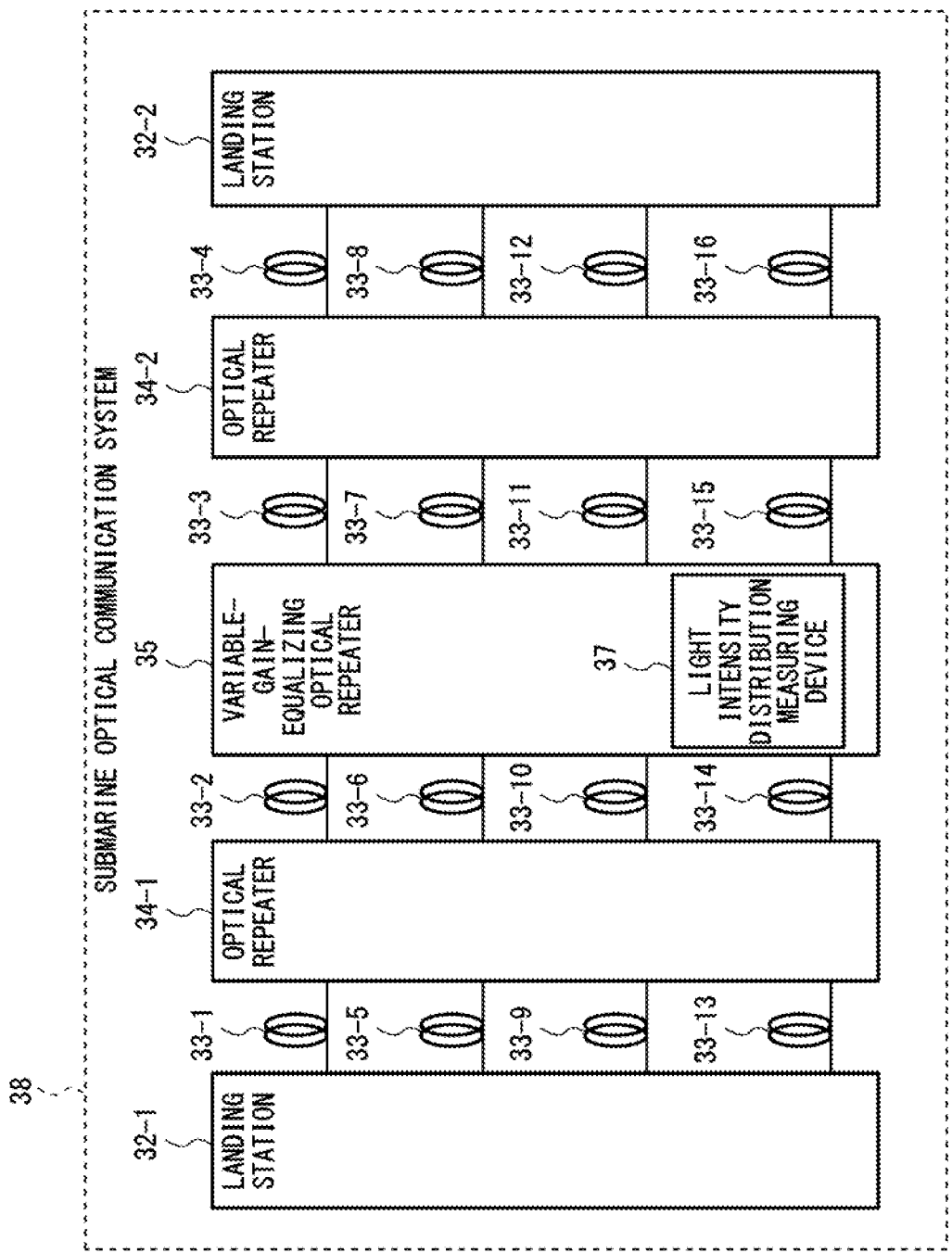
FIG. 15A is a block diagram illustrating a configuration of a submarine optical communication system control device related to the third example embodiment of the present invention.

FIG. 15A illustrates a configuration of a submarine optical communication system 38 related to the present example embodiment. The submarine optical communication system 38 is configured with landing stations 32, submarine cable transmission lines 33, optical repeaters 34, a variable-gain-equalizing optical repeater 35, and a light intensity distribution measuring device 37.

Figure 15B:
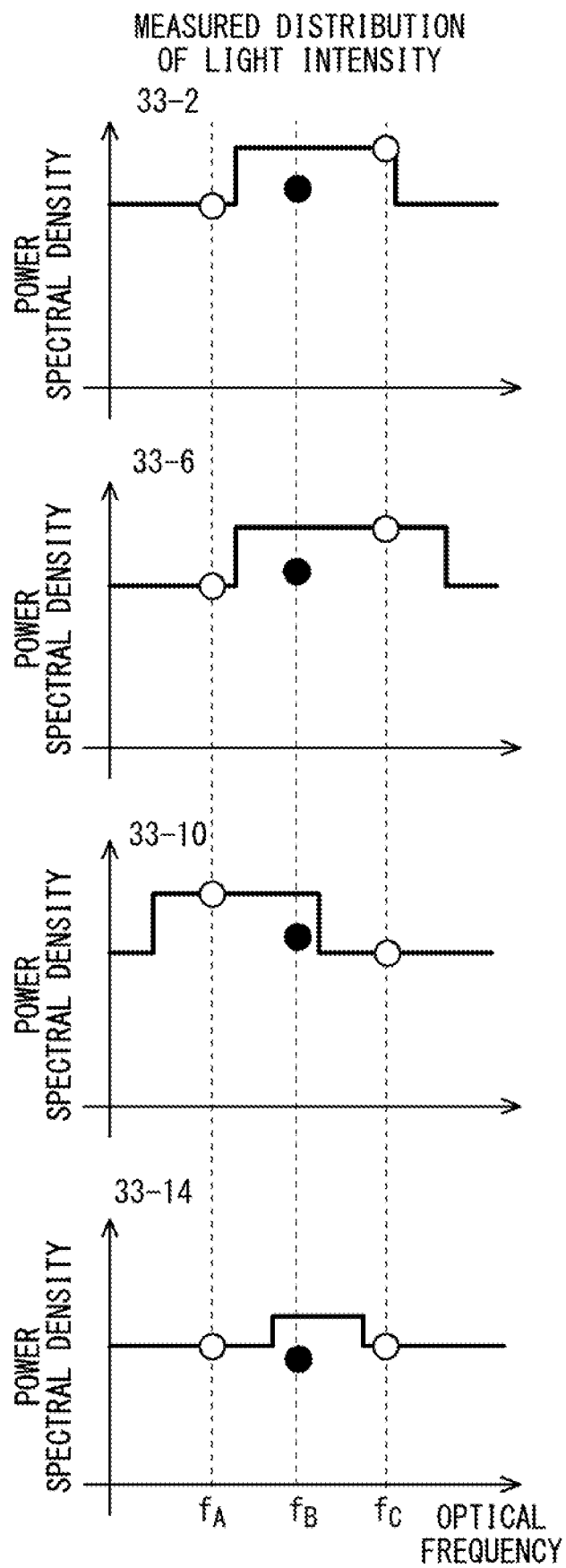
FIG. 15B is a diagram illustrating an example of a light intensity distribution measured by a light intensity distribution measuring device according to the third example embodiment of the present invention.
Figure 16:
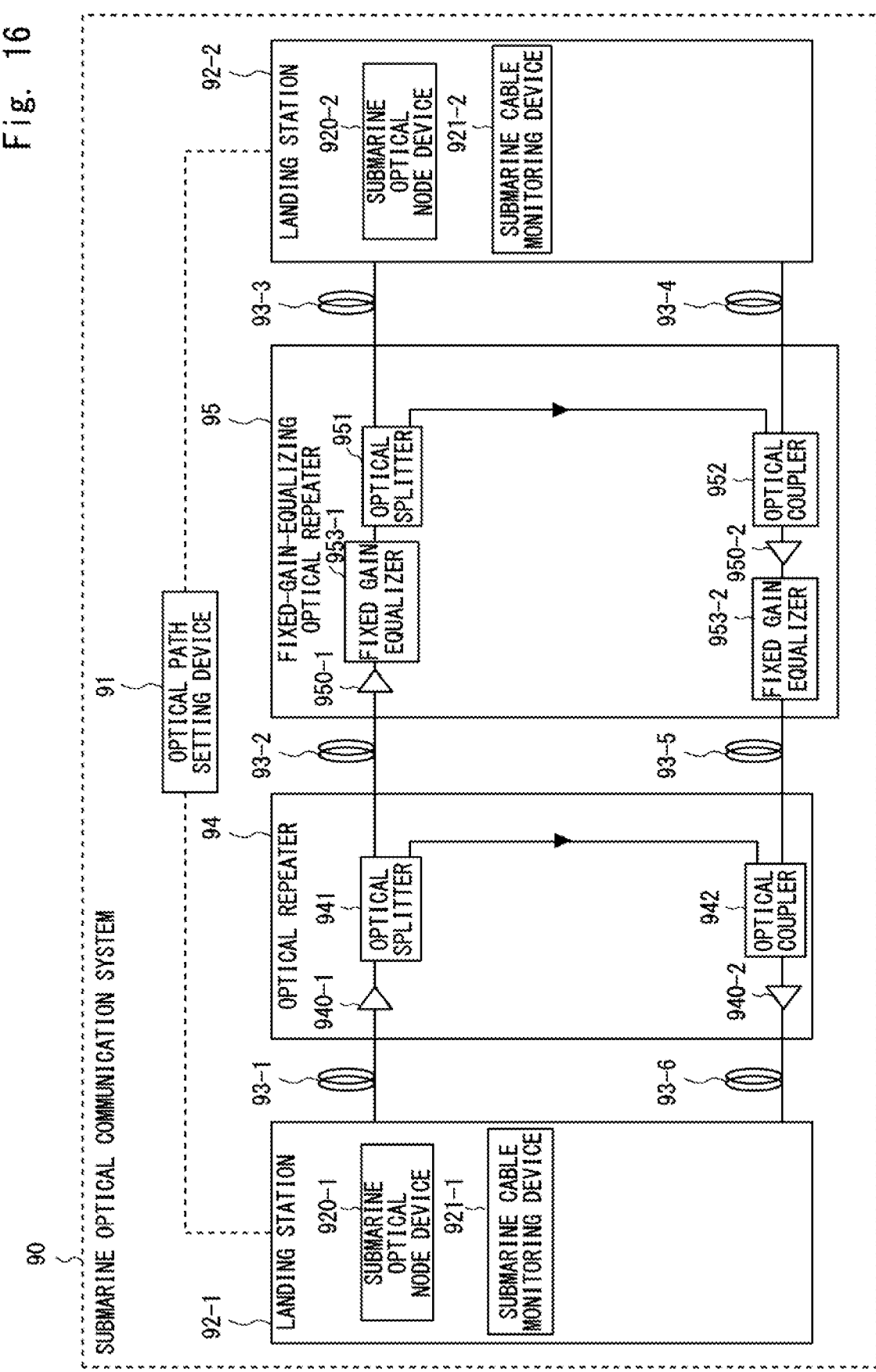
FIG. 16 is a block diagram illustrating a configuration of a related submarine optical communication system.

FIG. 15B illustrates an example of a light intensity distribution measured by the light intensity distribution measuring device 37. A solid line represents a setting value of the light intensity distribution, and a circle represents a value of light intensity (power spectral density) at each optical frequency ($f_A$, $f_B$, $f_C$) measured by the light intensity distribution measuring device 37. The measured value at the optical frequency $f_B$ uniformly indicates a value lower than the setting value of output signal light for each submarine cable transmission line 33. Accordingly, a frequency characteristic of the light intensity distribution measuring device 37 is corrected by the mean difference between the setting value and the measured value for the optical frequency $f_B$.

By performing the procedures described above at fixed time intervals, aging of the frequency characteristic in the light intensity distribution measuring device 37 can be corrected.

As described above, the submarine optical communication system 30 according to the present example embodiment can suppress transmission characteristic degradation and enhance utilization efficiency of the submarine optical communication system by setting input signal light intensity to an optimum value by controlling the gain equalizer, based on a measured value of signal light intensity in the submarine cable transmission line, even for a plurality of beams of signal light having different optimum values of input signal light intensity in the submarine optical communication system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

In the examples described above, programs can be stored by use of various types of non-transitory computer-readable media and be supplied to computers. The non-transitory computer-readable media include various types of tangible storage media. Examples of the non-transitory computer-readable media include magnetic storage media (such as a flexible disk, a magnetic tape, and a hard disk drive), magneto-optical storage media (such as a magneto-optical disk), a CD-read only memory (ROM), a CD-R, a CD-R/W, and semiconductor memories [such as a mask ROM, a programmable ROM (PROM), an erasable PROM (EPROM), a flash ROM, and a random access memory (RAM)]. The programs may also be supplied to computers by various types of transitory computer-readable media. Examples of the transitory computer-readable media include an electric signal, an optical signal, and an electromagnetic wave. A transitory computer-readable medium can supply a program to a computer through wired communication channels such as an electric cable and an optical fiber, or a wireless communication channel.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 10, 17, 20, 30, 38 SUBMARINE OPTICAL COMMUNICATION SYSTEM
11, 21, 31 OPTICAL PATH SETTING DEVICE
12-1, 12-2, 22-1, 22-2, 32-1, 32-2 LANDING STATION
120-1, 120-2, 220-1, 220-2, 320-1, 320-2 SUBMARINE OPTICAL NODE DEVICE
121-1, 121-2, 221-1, 221-2, 321-1, 321-2 SUBMARINE CABLE MONITORING DEVICE
122-1, 122-2, 222-1, 222-2, 322-1, 322-2 LIGHT INTENSITY DISTRIBUTION DETERMINATION DEVICE
13-1, 13-2, 13-3, 13-4, 13-5, 13-6, 13-7, 13-8, 13-9, 13-10, 13-11, 13-12, 13-13, 13-14, 13-15, 13-16, 13-17, 13-18, 13-19, 13-20, 13-21, 13-22, 13-23, 13-24, 23-1, 23-2, 23-3, 23-4, 23-5, 23-6, 33-1, 33-2, 33-3, 33-4, 33-5, 33-6, 33-7, 33-8, 33-9, 33-10, 33-11, 33-12, 33-13, 33-14, 33-15, 33-16 SUBMARINE CABLE TRANSMISSION LINE
14, 14-1, 14-2, 14-3, 14-4, 14-5, 14-6, 14-7, 14-8, 24, 34, 34-1, 34-2 OPTICAL REPEATER
140-1, 140-2, 150-1, 150-2, 240-1, 240-2, 250-1, 250-2, 340-1, 340-2, 340-3, 340-4, 350-1, 350-2, 350-3, 350-4 OPTICAL AMPLIFIER
141, 151, 163, 241, 251, 273, 341-1, 341-2, 351-1, 351-2, 373-1, 373-2 OPTICAL SPLITTER
142, 152, 242, 252, 342-1, 342-2, 352-1, 352-2 OPTICAL COUPLER
15, 15-1, 15-2, 15-3, 25, 35 VARIABLE-GAIN-EQUALIZING OPTICAL REPEATER
153-1, 153-2, 253-1, 253-2, 353-1, 353-2, 353-3, 353-4 VARIABLE GAIN EQUALIZER
16 EQUALIZATION SETTING DETERMINATION DEVICE
160 EQUALIZATION SETTING CALCULATION UNIT
161, 271, 371 LIGHT INTENSITY DISTRIBUTION MONITOR
162, 272, 372 SETTING NOTIFICATION I/F
223-1, 223-2, 323-1, 323-2 EQUALIZATION SETTING DETERMINATION DEVICE
374 OPTICAL SWITCH
90 RELATED SUBMARINE OPTICAL COMMUNICATION SYSTEM
91 OPTICAL PATH SETTING DEVICE
92-1, 92-2 LANDING STATION
920-1, 920-2 SUBMARINE OPTICAL NODE DEVICE
921-1, 921-2 SUBMARINE CABLE MONITORING DEVICE
93-1, 93-2, 93-3, 93-4, 93-5, 93-6 SUBMARINE CABLE TRANSMISSION LINE
94 OPTICAL REPEATER
940-1, 940-2, 950-1, 950-2 OPTICAL AMPLIFIER
941, 951 OPTICAL SPLITTER
942, 952 OPTICAL COUPLER
95 FIXED-GAIN-EQUALIZING OPTICAL REPEATER
953-1, 953-2 FIXED GAIN EQUALIZER

The invention claimed is:

1. A submarine optical communication system control device comprising:
   a light intensity distribution determination device configured to determine an optimum distribution of signal light intensity of an optical path for each allocated frequency;
   a light intensity distribution measuring device configured to measure a light intensity distribution of an optical path after transmission through a submarine cable transmission line;
   an equalization setting calculation unit configured to calculate a gain equalization setting for compensating for a difference between an optimum distribution in the light intensity distribution determination device and a measured distribution in the light intensity distribution measuring device; and
   a variable gain equalizer configured to compensate for a light intensity distribution of an optical path to the optimum distribution, based on a gain equalization setting in the equalization setting calculation unit.

2. The submarine optical communication system control device according to claim 1, wherein the light intensity distribution measuring device measures the light intensity distribution at a fixed bandwidth and at predetermined fixed frequency intervals.

3. The submarine optical communication system control device according to claim 2, wherein the frequency interval is equal to or less than a minimum value of a center frequency interval of an optical path allocated to the submarine cable transmission line.

4. The submarine optical communication system control device according to claim 3, wherein the frequency interval can be varied by one of a temperature change in the light intensity distribution measuring device, a selection of diffracted light of a grating element, and a liquid crystal on silicon (LCOS) based wavelength selection.

5. The submarine optical communication system control device according to claim 1, further comprising one or more optical repeaters each including an optical amplifier configured to compensate for light intensity loss in the submarine cable transmission line, wherein
the optical repeaters are placed on the submarine cable transmission line at fixed distances,
each of the optical repeaters at a fixed interval from each other includes the light intensity distribution measuring device and the variable gain equalizer, and
the variable gain equalizer compensates for the measured distribution in the light intensity distribution measuring device included in the same optical repeater to the optimum distribution.

6. The submarine optical communication system control device according to claim 1, wherein
the light intensity distribution measuring device includes an optical switch configured to select the light intensity distribution to be measured, out of a plurality of submarine cable transmission lines, and
after the submarine cable transmission line accommodating the optical path is selected,
the variable gain equalizer connected to the submarine cable transmission line makes compensation, based on a difference for the submarine cable transmission line between the optimum distribution and the measured distribution.

7. The submarine optical communication system control device according to claim 6, wherein
the equalization setting calculation unit performs preprocessing of calculating a linear combination of each value of the measured distribution, and
an amount of compensation by the variable gain equalizer is adjusted based on a difference between the optimum distribution and a preprocessed measured distribution.

8. The submarine optical communication system control device according to claim 6, wherein the equalization setting calculation unit calculates a difference between the optimum distribution and the measured distribution for the each submarine cable transmission line and adjusts an amount of compensation by the variable gain equalizer, based on a difference for the same frequency band.

9. The submarine optical communication system control device according to claim 8, wherein the equalization setting calculation unit adjusts an amount of compensation by the variable gain equalizer, based on a value of one of a mean, a median, a mean excluding an outlier, and a median excluding an outlier of a difference for the same frequency band.

10. The submarine optical communication system control device according to claim 1, further comprising a submarine cable monitoring device configured to monitor failure occurrence in a submarine optical communication system, wherein,
with respect to an allocated frequency of an optical path received signal quality of which falls below a preset failure threshold value, the light intensity distribution measuring device measures light intensity at the frequency and notifies, to a submarine cable monitoring device, that a difference between measured light intensity and optimum light intensity exceeds a failure threshold value, and
detects failure occurrence at a device closest to a transmitting end, out of one or more of the light intensity distribution measuring devices exceeding the failure threshold value.

11. The submarine optical communication system control device according to claim 1, wherein the light intensity distribution determination device determines an optimum distribution of signal light intensity of an optical path for each allocated frequency from a value of one of a transmission characteristic related to received signal quality, frequency utilization efficiency, a signal light power spectral density, and a waveform distortion compensation setting, or a combination of values thereof.

12. The submarine optical communication system control device according to claim 1, wherein the device is in operation when an optical path is added to, changed in, or deleted from a submarine cable transmission line.

13. The submarine optical communication system control device according to claim 12, wherein, in ascending order of distance between an optical repeater including a light intensity distribution measuring device and a variable gain equalizer, and a transmitting end of an optical path to be added to, changed in, or deleted from the submarine cable transmission line, the variable gain equalizer included in the optical repeater makes compensation to the optimum distribution.

14. A submarine optical communication system control method comprising:
determining an optimum distribution of signal light intensity of an optical path for each allocated frequency;
measuring a light intensity distribution of an optical path after transmission through a submarine cable transmission line;
calculating a gain equalization setting for compensating for a difference between an optimum distribution of a light intensity distribution and a measured distribution of an optical path after transmission; and
compensating for a light intensity distribution of an optical path to the optimum distribution, based on the gain equalization setting.

15. A non-transitory computer-readable medium storing a program for causing a computer to execute:
a light intensity distribution determination procedure for determining an optimum distribution of signal light intensity of an optical path for each allocated frequency;
an equalization setting calculation procedure for calculating a gain equalization setting for compensating for a difference between the optimum distribution and a measured distribution of light intensity measured for an optical path after transmission through a submarine cable transmission line; and
an equalization setting notification procedure for notifying a setting for compensating for a light intensity distribution of an optical path to the optimum distribution, based on a gain equalization setting in the equalization setting calculation procedure.

* * * * *